(12) United States Patent
Fujimoto et al.

(10) Patent No.: US 12,139,017 B2
(45) Date of Patent: Nov. 12, 2024

(54) VEHICLE

(71) Applicant: HONDA MOTOR CO., LTD., Tokyo (JP)

(72) Inventors: Naotoshi Fujimoto, Wako (JP); Ryo Shimoe, Wako (JP); Takahiro Matsuoka, Wako (JP); Takeru Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 17/981,863

(22) Filed: Nov. 7, 2022

(65) Prior Publication Data
US 2023/0158889 A1    May 25, 2023

(30) Foreign Application Priority Data
Nov. 22, 2021   (JP) .................. 2021-189589

(51) Int. Cl.
*B60K 35/60* (2024.01)
*B60K 35/22* (2024.01)
*B60K 35/28* (2024.01)
*B60K 35/29* (2024.01)

(52) U.S. Cl.
CPC .............. *B60K 35/60* (2024.01); *B60K 35/22* (2024.01); *B60K 35/28* (2024.01); *B60K 35/29* (2024.01); *B60K 2360/179* (2024.01); *B60K 2360/188* (2024.01)

(58) Field of Classification Search
CPC ........ B60K 35/00; B60K 35/60; B60K 35/28; B60K 2360/188; B60K 35/29
See application file for complete search history.

(56) References Cited

U.S. PATENT DOCUMENTS

| | | | |
|---|---|---|---|
| 9,623,751 B2 | 4/2017 | Inomata | |
| 10,723,264 B2 | 7/2020 | Fujisawa et al. | |
| 2009/0187343 A1* | 7/2009 | Koch-Groeber | B60W 40/04 701/301 |
| 2013/0249684 A1* | 9/2013 | Hatakeyama | G08G 1/166 340/435 |
| 2015/0193664 A1* | 7/2015 | Marti | G08B 21/06 382/103 |
| 2016/0046189 A1 | 2/2016 | Inomata | |
| 2018/0086346 A1 | 3/2018 | Fujisawa et al. | |
| 2018/0118109 A1 | 5/2018 | Fujisawa et al. | |

(Continued)

FOREIGN PATENT DOCUMENTS

| | | |
|---|---|---|
| JP | 2006-221498 A | 8/2006 |
| JP | 2010-123026 A | 6/2010 |

(Continued)

OTHER PUBLICATIONS

Office Action dated Jun. 12, 2023, issued in counterpart to JP Application No. 2021-189589, with English Translation. (9 pages).

*Primary Examiner* — Mirza F Alam
(74) *Attorney, Agent, or Firm* — WHDA, LLP

(57) ABSTRACT

A vehicle is provided. A detector detects an object at least ahead of the vehicle. A display is provided on an instrument panel of the vehicle and displays a signal at a position corresponding to a direction of the object detected by the detector. The display includes a part recessed forward in a vehicle longitudinal direction in plan view.

13 Claims, 19 Drawing Sheets

(56) References Cited

U.S. PATENT DOCUMENTS

| | | | |
|---|---|---|---|
| 2018/0180880 A1* | 6/2018 | Katagiri | G02B 27/0101 |
| 2018/0304749 A1 | 10/2018 | Cho et al. | |
| 2022/0297713 A1* | 9/2022 | Wang | B60W 40/105 |

FOREIGN PATENT DOCUMENTS

| | | |
|---|---|---|
| JP | 2014-211542 A | 11/2014 |
| JP | 2016-182892 A | 10/2016 |
| JP | 2016-197407 A | 11/2016 |

\* cited by examiner

FIG. 8
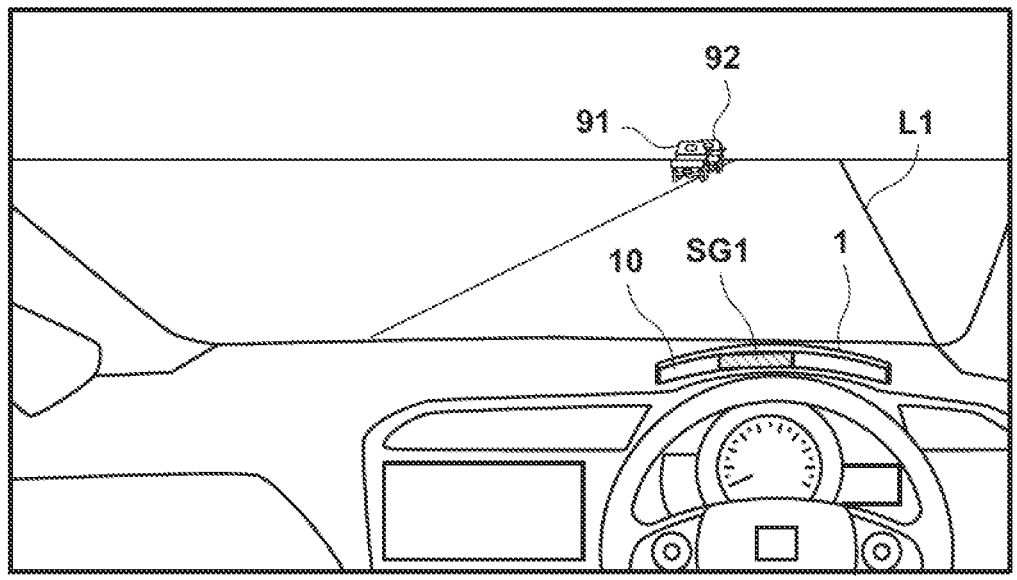
ST101
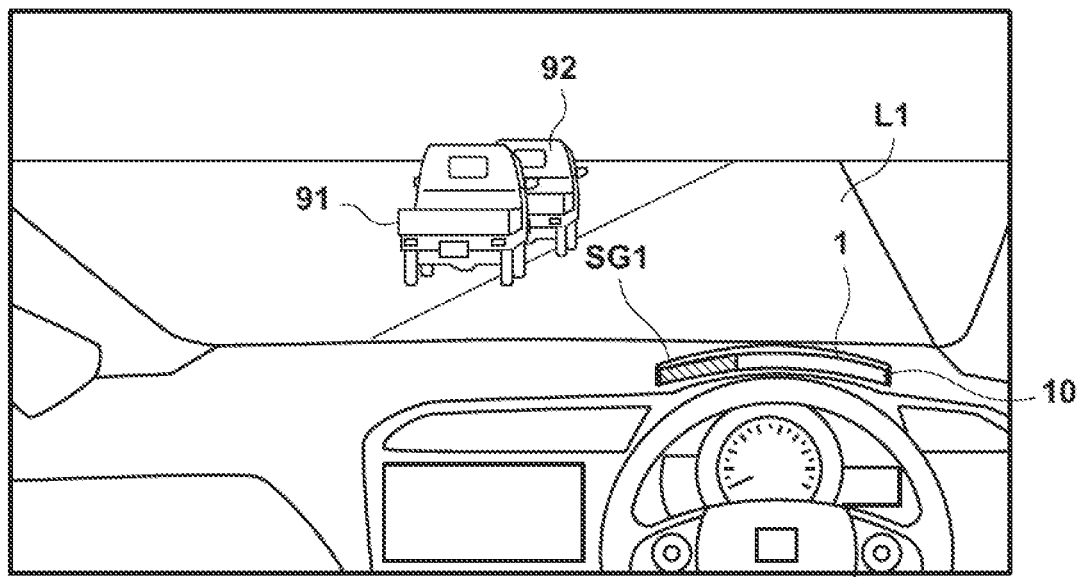
ST102

FIG. 9
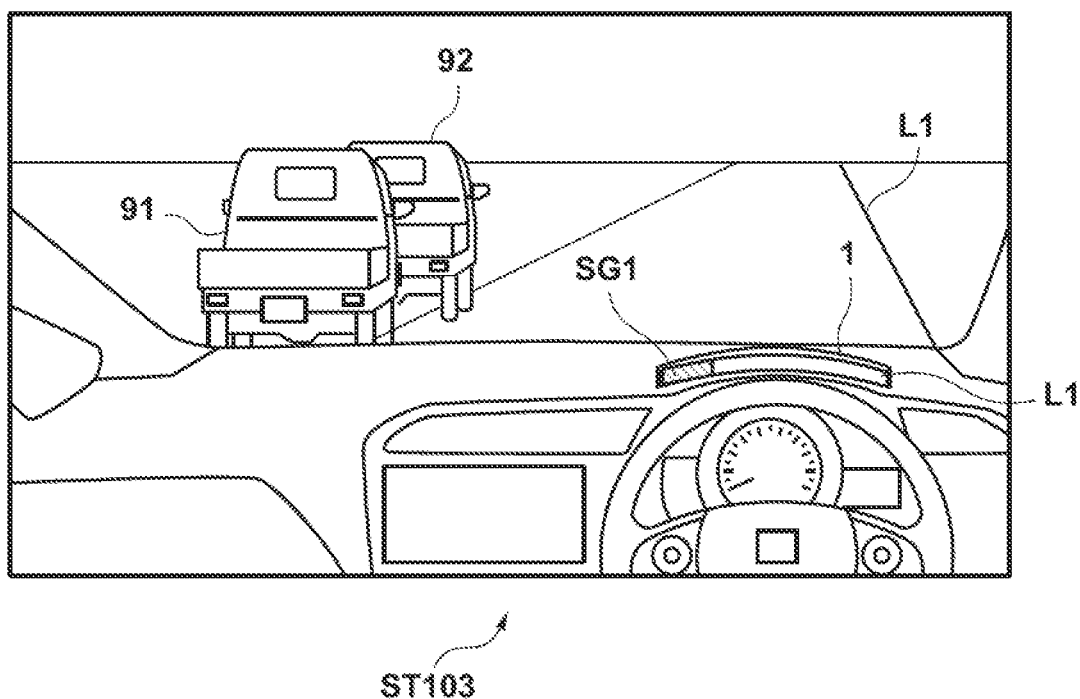
ST103
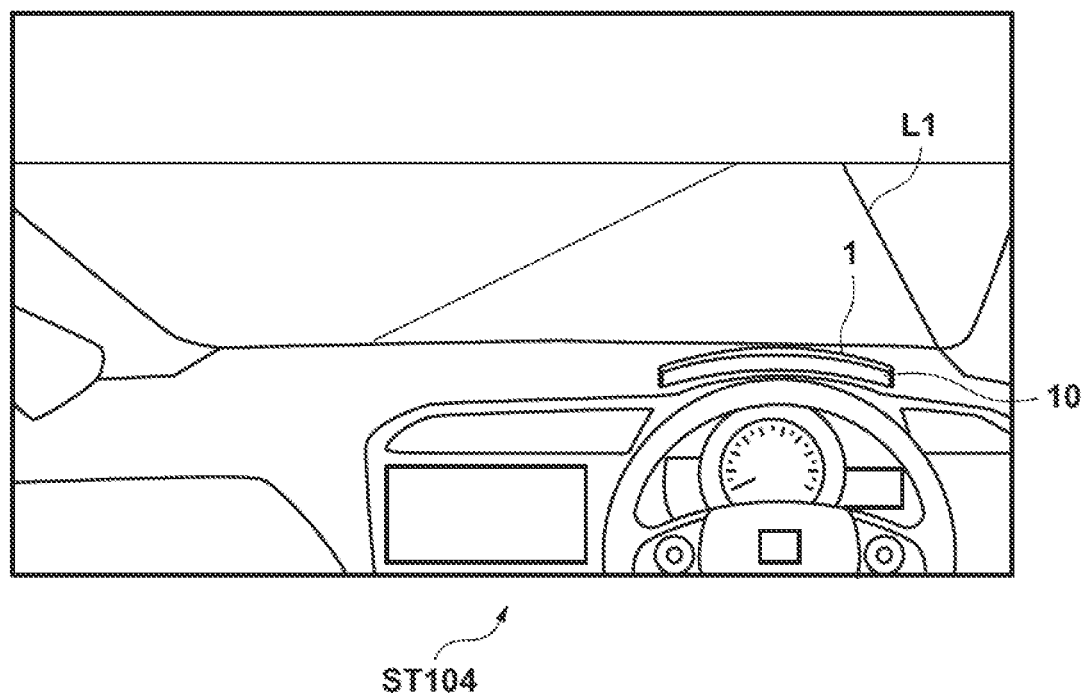
ST104

FIG. 12
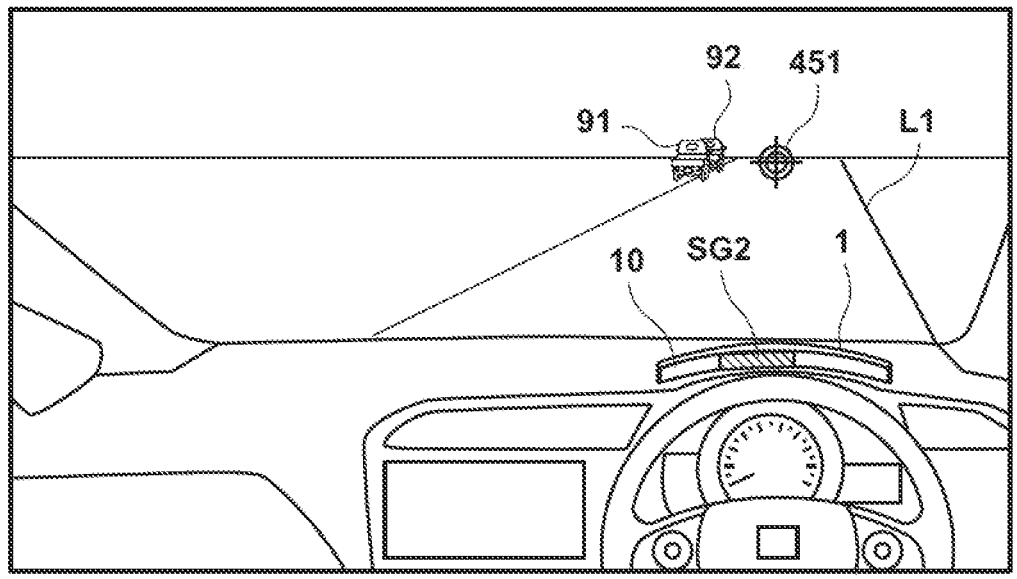
ST201
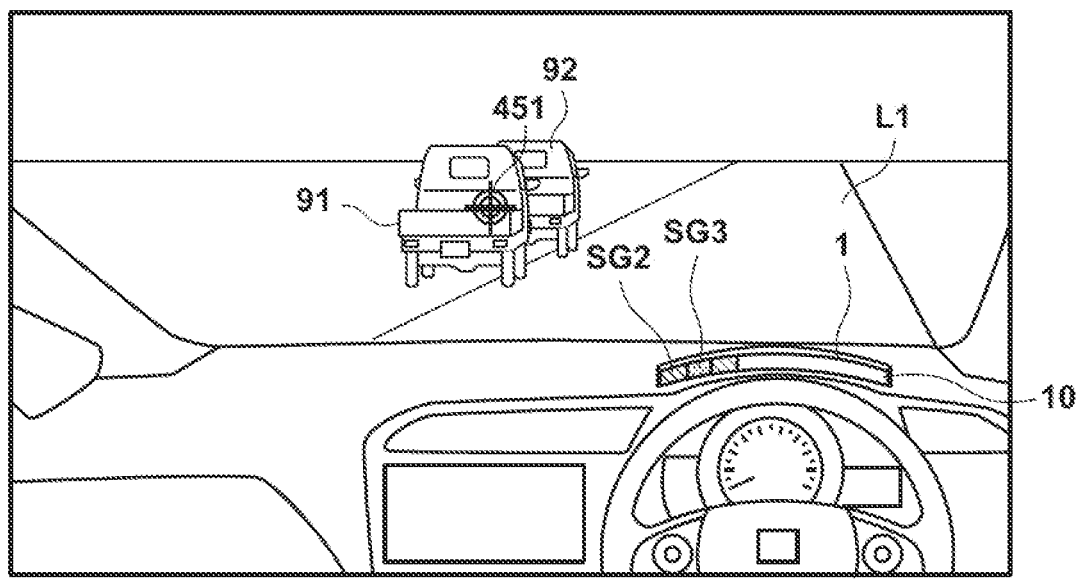
ST202

FIG. 13
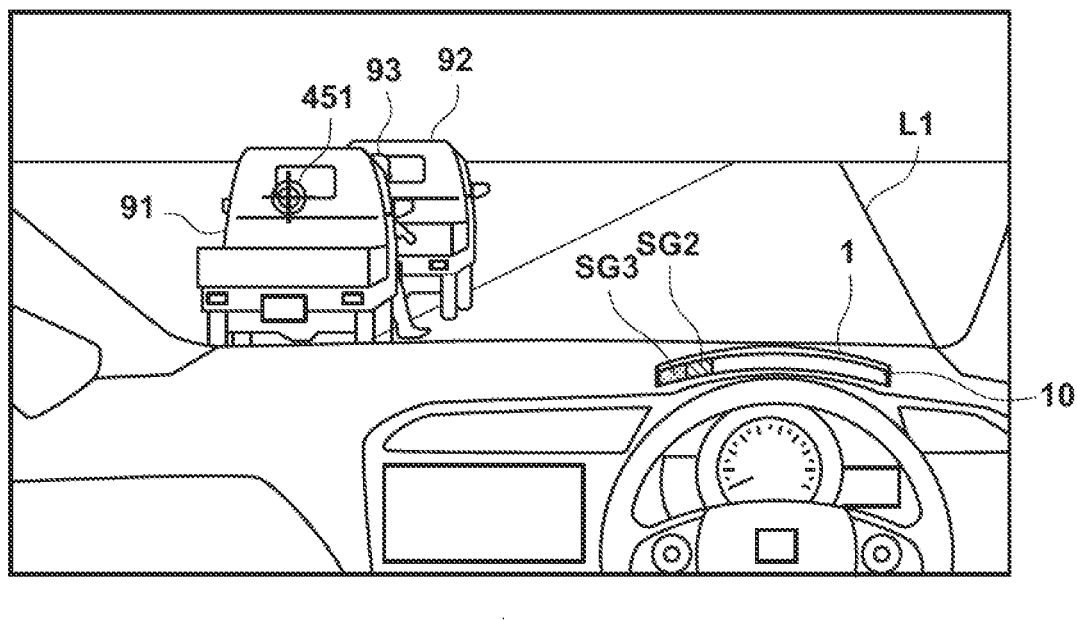
ST203
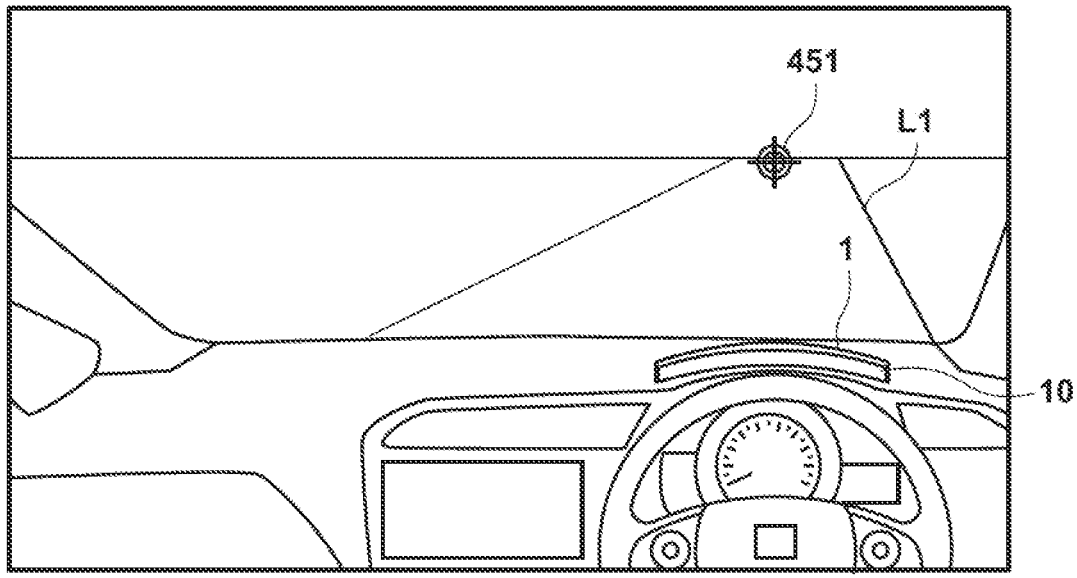
ST204

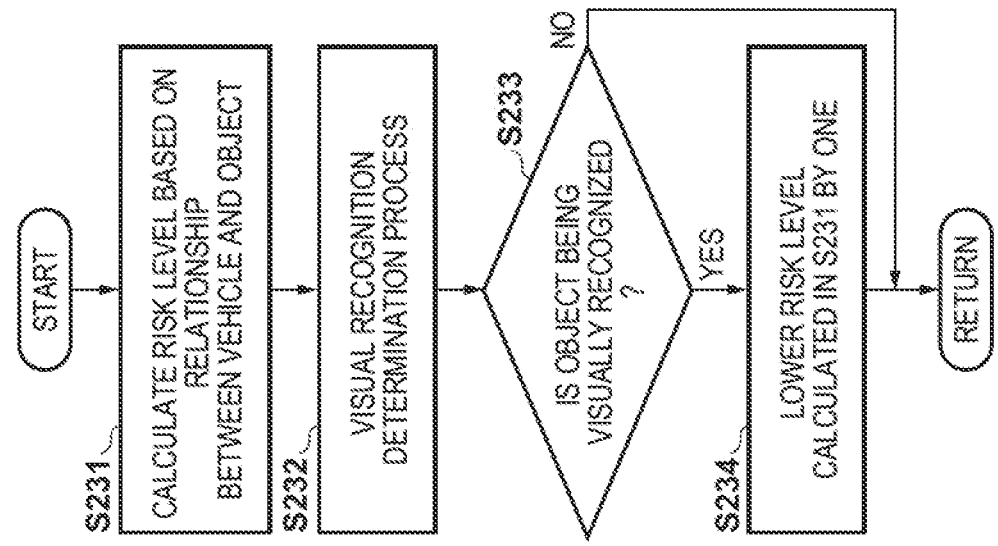
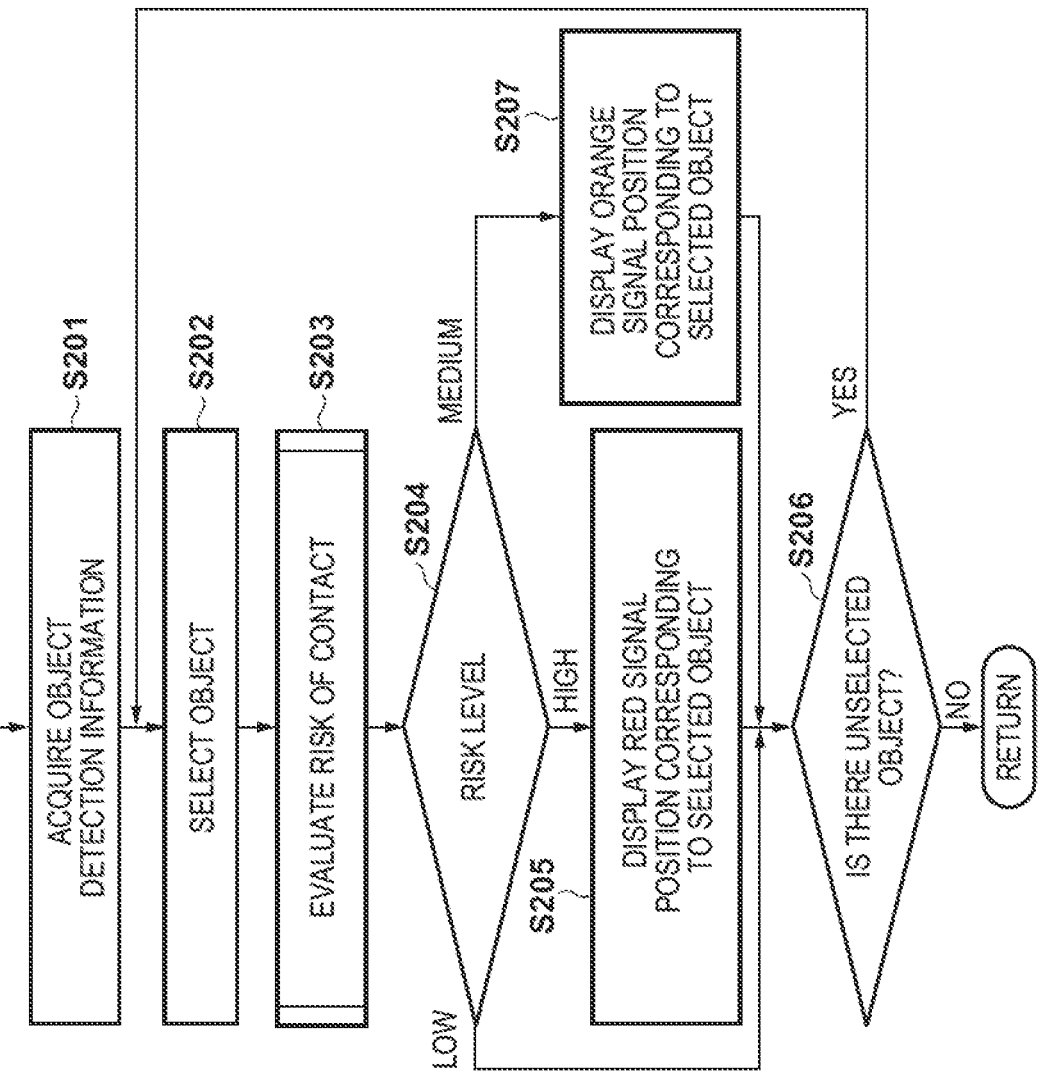

FIG. 16
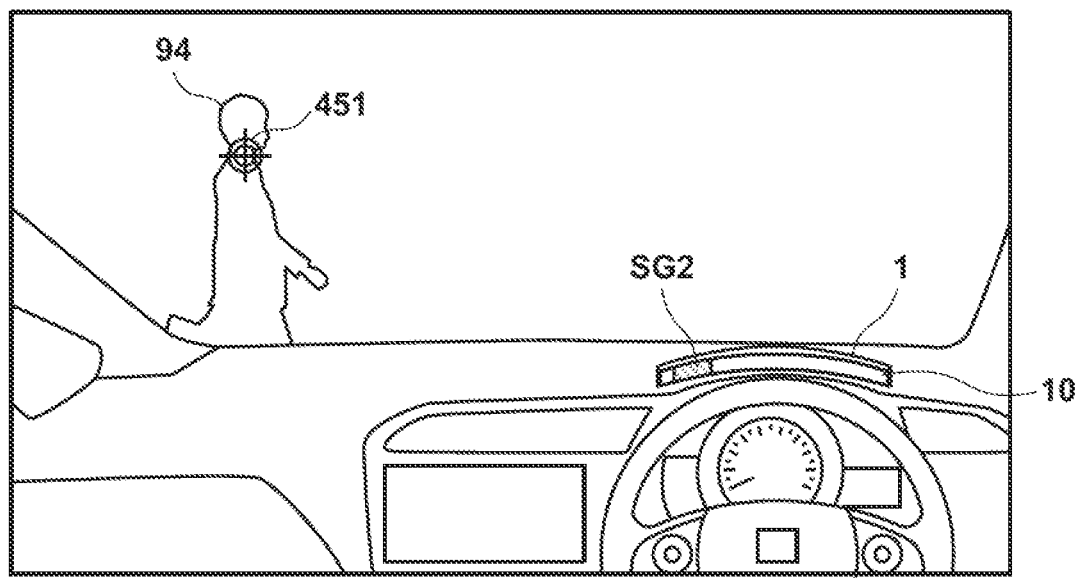
ST301
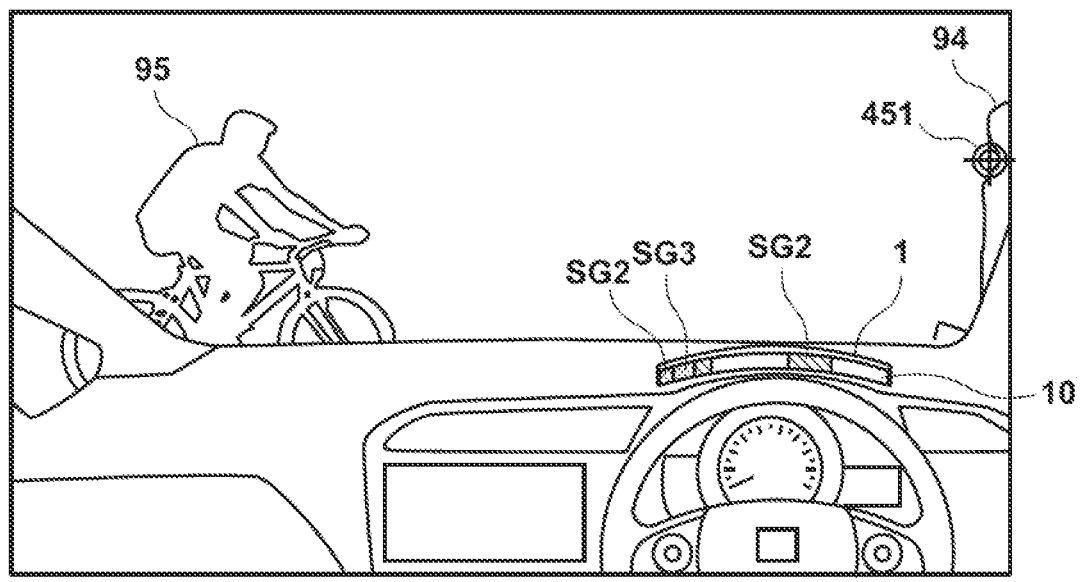
ST302

FIG. 17
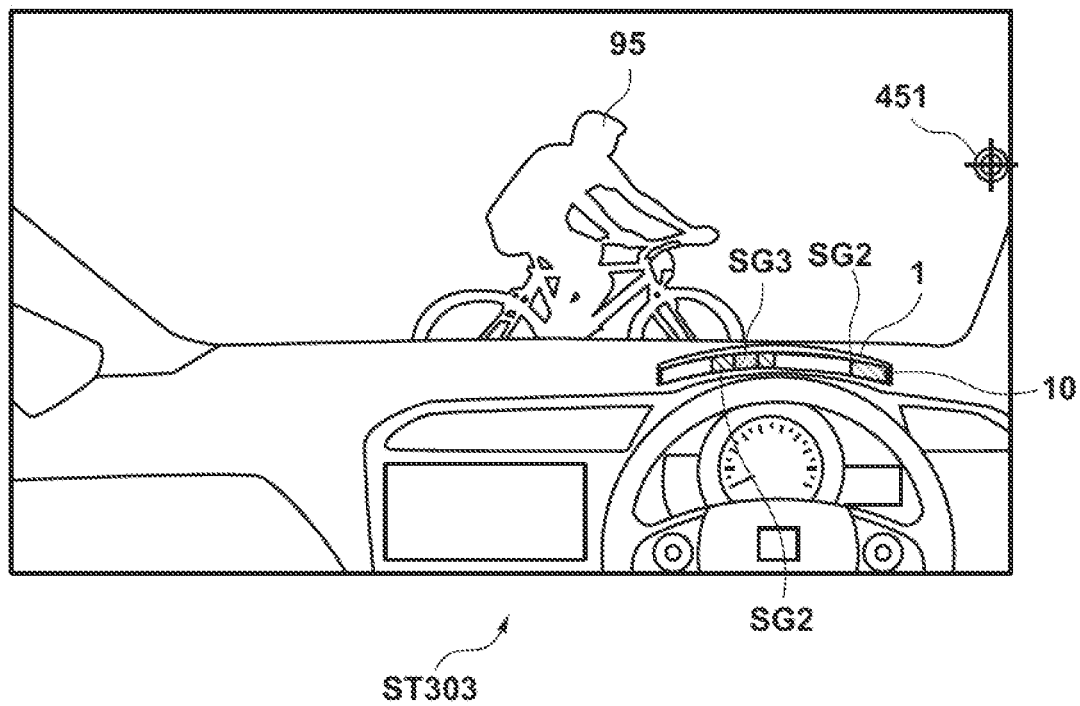
ST303
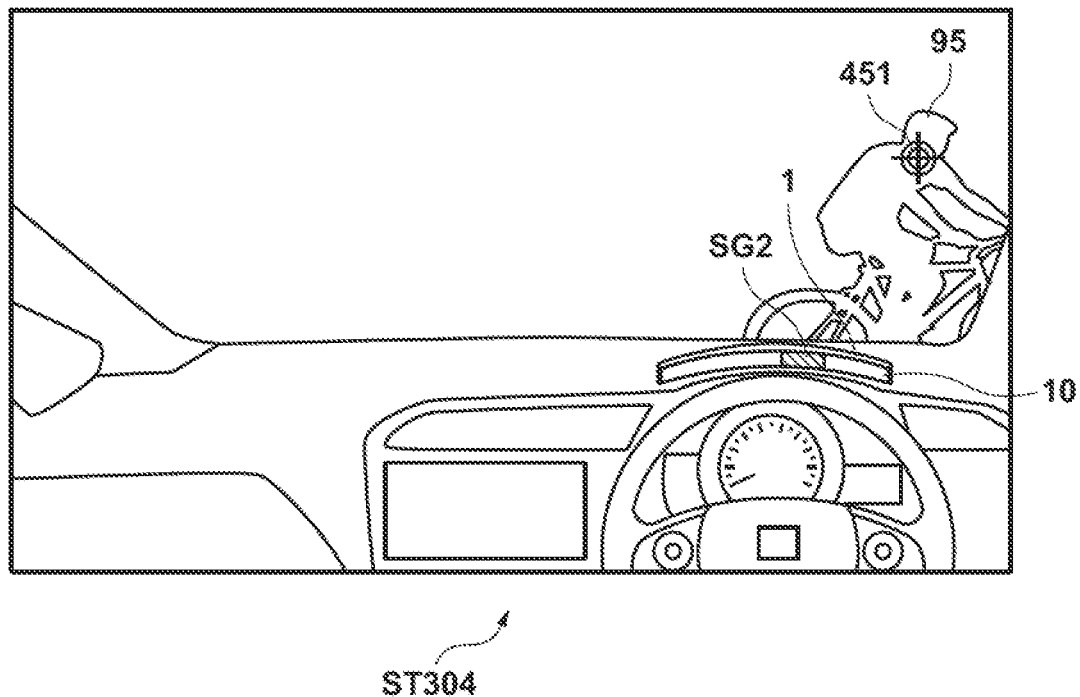
ST304

VEHICLE

CROSS-REFERENCE TO RELATED APPLICATION(S)

This application claims priority to and the benefit of Japanese Patent Application No. 2021-189589 filed on Nov. 22, 2021, the entire disclosure of which is incorporated herein by reference.

BACKGROUND OF THE INVENTION

Field of the Invention

The present invention relates to a vehicle.

Description of the Related Art

Techniques for notifying drivers of the surrounding situation of the vehicles have been proposed. For example, Japanese Patent Laid-Open No. 2016-182892 describes an in-vehicle display device that displays an icon on a screen with a display position and a display color that depend on the direction of a pedestrian and with a size that depends on the distance between the pedestrian and the vehicle.

SUMMARY OF THE INVENTION

According to embodiment of the present invention, there is provided a vehicle comprising: a detector configured to detect an object at least ahead of the vehicle; and a display provided on an instrument panel of the vehicle and configured to display a signal at a position corresponding to a direction of the object detected by the detector, wherein the display includes a part recessed forward in a vehicle longitudinal direction in plan view.

BRIEF DESCRIPTION OF THE DRAWINGS

FIG. 8 is a forward view from the driver's seat of the vehicle in each state in the situation of FIG. 7;

FIG. 9 is a forward view from the driver's seat of the vehicle in each state in the situation of FIG. 7;

FIG. 12 is a forward view from the driver's seat of the vehicle in each state in the situation of FIG. 11;

FIG. 13 is a forward view from the driver's seat of the vehicle in each state in the situation of FIG. 11;

FIG. 14A is a flowchart illustrating a processing example of an ECU;

FIG. 14B is a flowchart illustrating a processing example of an ECU;

FIG. 16 is a forward view from the driver's seat of the vehicle in each state in the situation of FIG. 15;

FIG. 17 is a forward view from the driver's seat of the vehicle in each state in the situation of FIG. 15;

DESCRIPTION OF THE EMBODIMENTS

Figure 1:
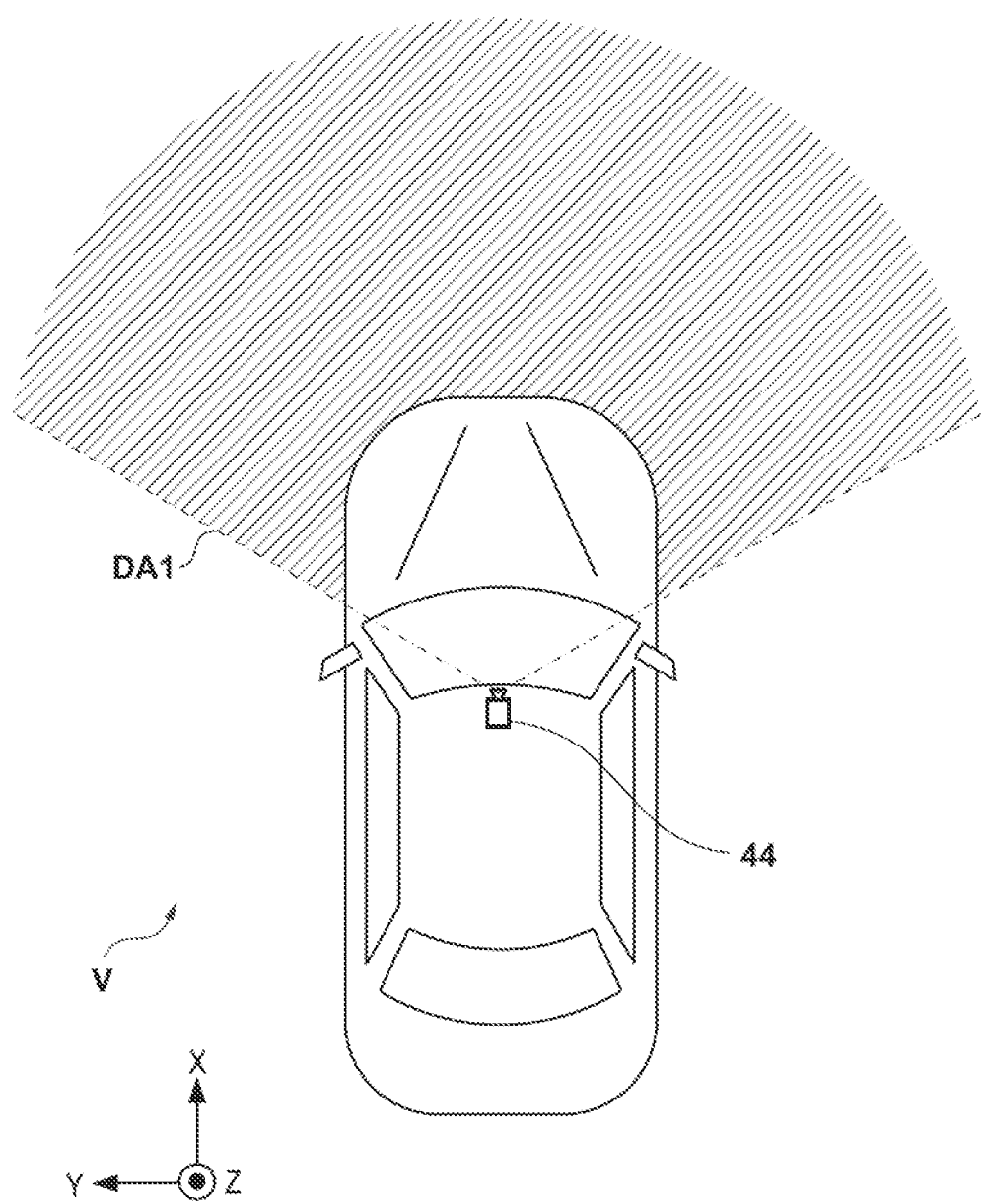
FIG. 1 is a plan view of a vehicle according to an embodiment.

Recent improvement in driving assistance technology and electrification of vehicles is accompanied by an increasing trend in information provision to drivers. Increasing information provision to drivers may make the drivers feel annoyed or hinder the drivers from recognizing necessary information. Therefore, from the viewpoint of improving traffic safety, it is desirable that drivers can more easily recognize necessary information such as the surrounding situation of the vehicles.

An embodiment of the present invention provides the surrounding situation of a vehicle to the driver in an easy-to-recognize manner.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

In addition, in each drawing, the X direction represents the longitudinal direction of a vehicle V, the Y direction represents the vehicle width direction of the vehicle V, and the Z direction represents the vertical direction of the vehicle V. In addition, in the present specification, expressions such as front/rear, left/right (lateral), and upper/lower indicate a relative positional relationship with respect to the vehicle body, and for example, expressions such as front and forward correspond to the +X direction, and expressions such as rear and rearward correspond to the —X direction. In addition, for example, expressions such as left and leftward correspond to the +Y direction, and expressions such as right and rightward correspond to the —Y direction. Similarly, expressions such as the inside of the vehicle body and the outside of the vehicle body (inside and outside of the vehicle) indicate a relative positional relationship with respect to the vehicle body.

<Outline of Vehicle>

FIG. 1 is a plan view of the vehicle V according to an embodiment. The vehicle V is equipped with a display device 1 to be described later. Here, a sedan-type four-wheeled passenger car is illustrated as the vehicle V, but the vehicle V may be another type of vehicle.

The vehicle V includes a detector 44 that detects an object at least ahead of the vehicle V. In the present embodiment, the detector 44 is a camera. The detector 44 is provided in the interior of the vehicle V, and captures an area ahead of the vehicle V, more specifically a detection angle range DA1, through a window 43 (front window). Note that millimeter wave radar, light detection and ranging (LIDAR), or the like may be used as the detector 44 in addition to the camera. Examples of objects that are detected by the detector 44 include objects that exist around the vehicle V and have a possibility of contact with the vehicle V, such as pedestrians, bicycles, parked vehicles, preceding vehicles, curbstones, or fallen objects on the road. In addition to objects, the detector 44 can also detect white lines or the like that define the traveling lane on which the vehicle V is traveling.

Figure 2:
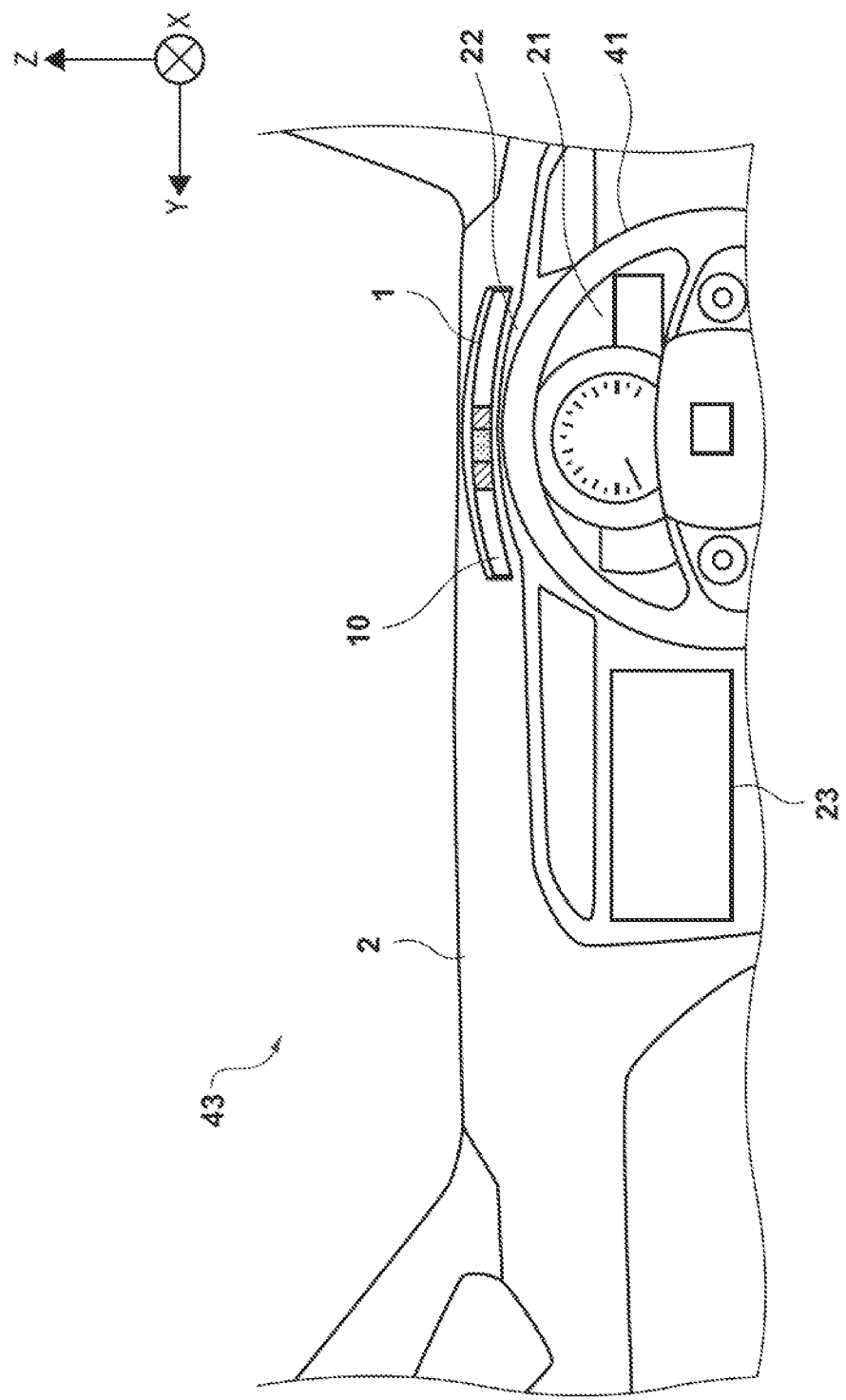
FIG. 2 is a view illustrating the interior configuration of the vehicle.

FIG. 2 is a view illustrating the interior configuration of the vehicle V as viewed forward from the driver's seat. Placed on the front side in the interior of the vehicle V is an instrument panel 2, on which various interior components are provided. For example, the instrument panel 2 is provided with a meter panel 21 on which information such as the state or traveling status of the vehicle V is displayed, a navigation system 23 on which information related to map information or audio is displayed, and the like. In the present embodiment, the meter panel 21 is provided on the back side of a steering wheel 41 as viewed from the driver's seat, and the navigation system 23 is provided at the center in the width direction of the vehicle V. The instrument panel 2 also includes a meter visor 22 that covers the upper part of the meter panel 21. The display device 1 is provided above the meter visor 22. The configuration of the display device 1 will be described later. In the interior of the vehicle V, a line-of-sight monitor 45 (see FIG. 6) that monitors the driver's line of sight is also provided. The line-of-sight monitor 45 can be placed on the upper side of the window 43, on the instrument panel 2, or the like.

<Display Device>

Figure 3:
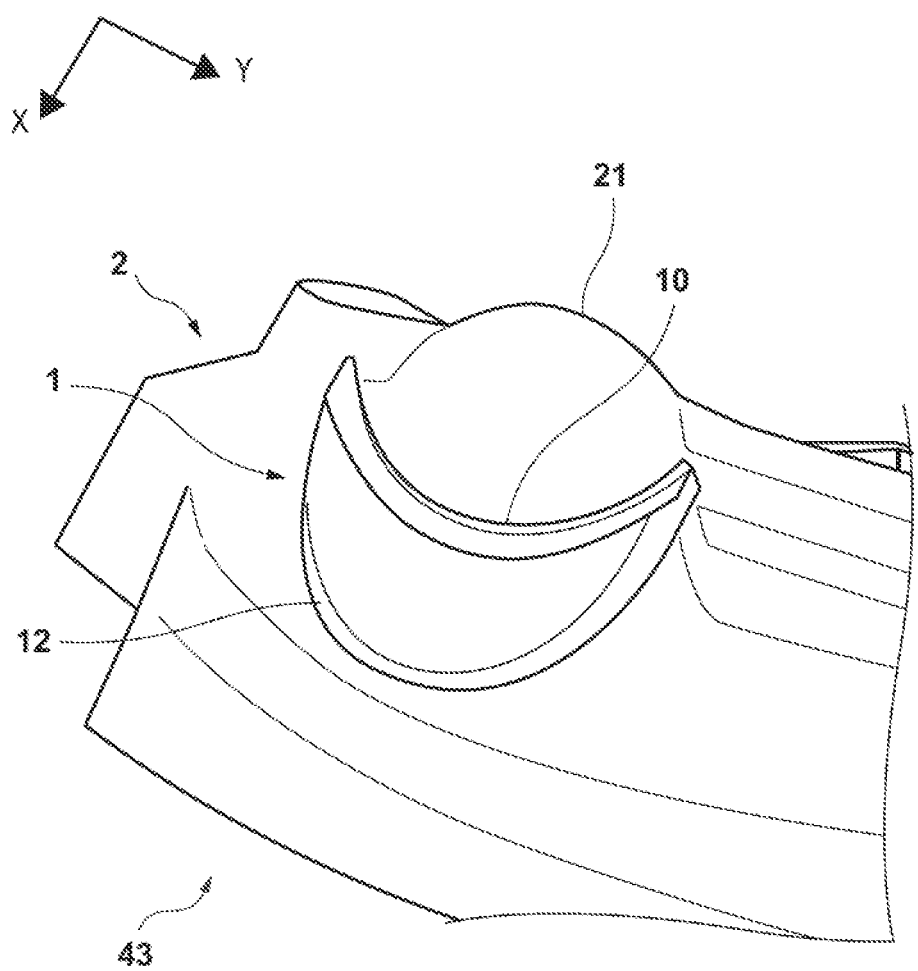
FIG. 3 is a perspective view illustrating the appearance of a display device.

Reference is made to FIG. 3 together with FIG. 2. FIG. 3 is a perspective view illustrating the appearance of the display device 1. The display device 1 includes a display 10 and a housing 12.

The display 10 displays a signal related to an object around the vehicle V. Specifically, the display 10 is provided on the instrument panel 2 of the vehicle V, and displays a signal at a position corresponding to the direction of the object detected by the detector 44. The display 10 is placed facing the rear of the vehicle V, and can be visually recognized by the driver seated in the driver's seat. More specifically, the display 10 is provided above the meter visor 22 included in the instrument panel 2. With this arrangement, the display 10 is located where the display 10 is likely to stay in the driver's field of vision during driving, so that the driver can easily check the indication on the display 10 during driving. In addition, the signal can enter the lower part of the driver's view without blocking the view. Instead of above the meter visor 22, the display 10 may be placed such that, for example, more than half of the display 10 is located on the driver's seat side relative to the center line of the vehicle V extending in the vehicle longitudinal direction. With the display 10 placed closer to the driver's seat in the vehicle width direction, the display 10 is likely to stay in the driver's view. In addition, as will be described in detail later, the display 10 in the present embodiment includes a plurality of light emitters 103 and a base portion 104 on which the light emitters 103 are arranged. The housing 12 is provided in front of the display 10 in the state where the display 10 is mounted on the vehicle V, and houses electronic circuit boards, electric wiring, and the like.

<Structure of Display>

Figure 4:
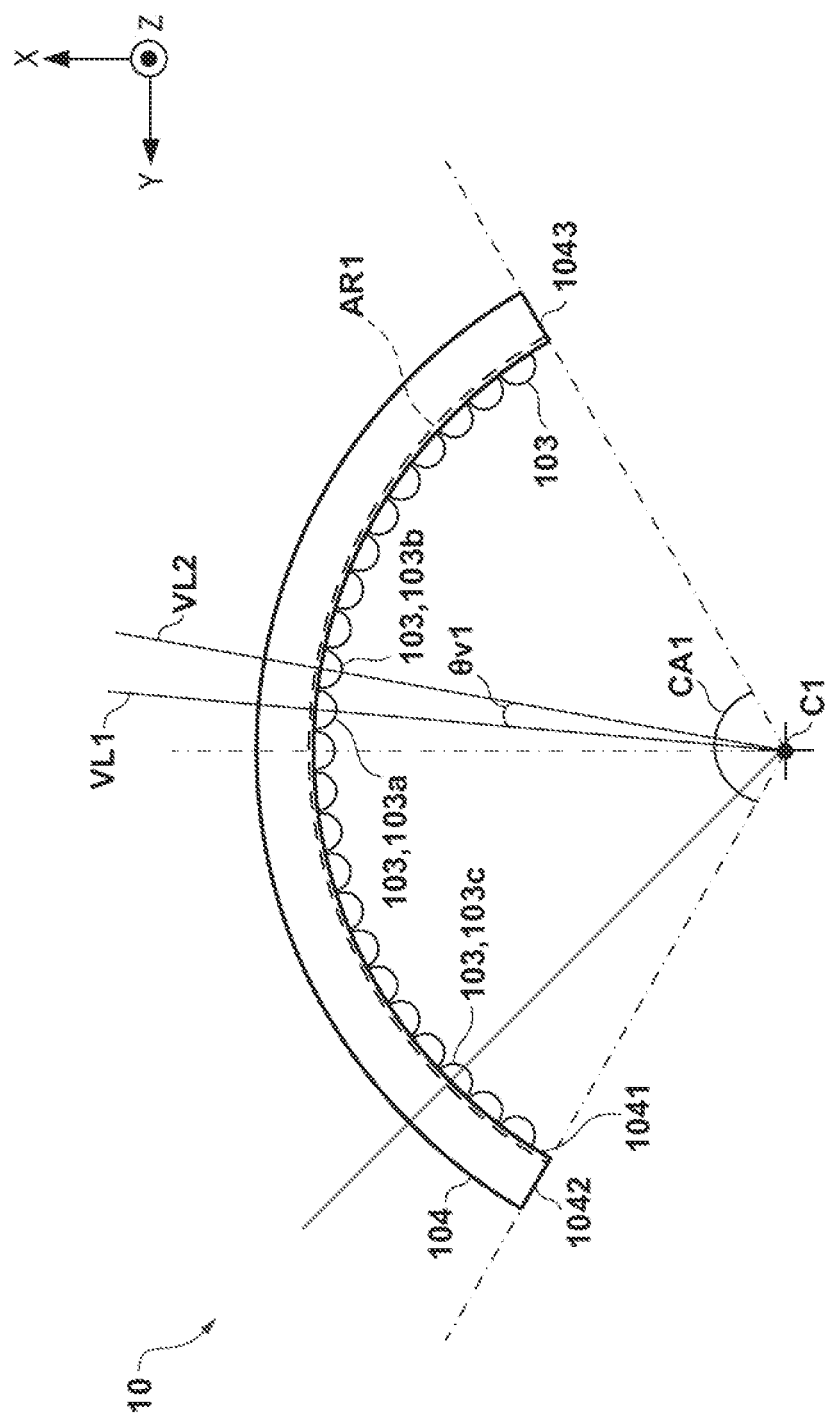
FIG. 4 is a schematic diagram illustrating the structure of a display.

FIG. 4 is a schematic diagram illustrating the structure of the display 10 as the display 10 is viewed from above in the state where the display device 1 is mounted on the vehicle V. With the following configuration, the display 10 displays a signal at a position corresponding to the direction of the object detected by the detector 44. For the sake of simplicity, reference numerals for some of a plurality of components of the same kind are omitted from the drawing.

The base portion 104 is formed extending in the vehicle width direction as a whole and also extending to the front of the vehicle V as it goes inward in the width direction of the base portion 104. In other words, the base portion 104 includes a part recessed forward in the vehicle longitudinal direction in plan view. The plurality of light emitters 103 are arranged on an arrangement surface 1041 which is a side surface of the base portion 104 facing the rear side in the vehicle longitudinal direction. In the present embodiment, the arrangement surface 1041 of the base portion 104 is formed in an arc shape recessed forward. Therefore, the plurality of light emitters 103 are arranged at predetermined intervals along a virtual arc AR1. Since the display 10 includes the part recessed forward in the vehicle longitudinal direction in plan view, the driver can readily recognize the correspondence between the direction of the object and a position on the display 10. More specifically, the direction of the object as viewed from the vehicle V can be more accurately reflected in the signal indication on the display 10.

In the present embodiment, the central angle CA1 of the arc AR1 corresponds to the detection angle range DA1 (see FIG. 1) of the detector 44. For example, the central angle CA1 of the arc AR1 and the detection angle range DA1 of the detector 44 may be set to 90 to 150 degrees, and more specifically to 120 degrees. Note that the central angle CA1 and the detection angle range DA1 can be regarded as corresponding to each other not only when these angles coincide with each other but also when the difference between these angles is within a predetermined range. For example, the difference between the central angle CA1 and the detection angle range DA1 may be within 5, 10, 20, or 30 degrees.

The plurality of light emitters 103 are arranged at predetermined intervals on the arrangement surface 1041 of the base portion 104. That is, in the present embodiment, the plurality of light emitters 103 are provided along the circumferential direction of the arc AR1. The number of light emitters 103 and the interval therebetween can be changed as appropriate, and for example, may be set according to the detection error in the detector 44. For example, the plurality of light emitters 103 may be arranged such that the angle formed by two virtual line segments each connecting the center C1 of the arc AR1 and one of two adjacent light emitters 103 of the plurality of light emitters 103 is equal to or larger than the detection error angle in the detector 44. In the example of FIG. 4, the number of light emitters 103 and the interval therebetween may be set such that the angle θv1 formed by the two virtual line segments VL1 and VL2 respectively connecting the center C1 of the arc AR1 and the two adjacent light emitters 103a and 103b is equal to or larger than the detection error in the detector 44. Consequently, it is possible to prevent the signal indication from flickering due to the influence of detection error in the detector 44.

In the present embodiment, the display 10 displays a signal at a position corresponding to the direction of the object detected by the detector 44. For example, if the detector 44 detects an object located in the direction of 45 degrees to the left with respect to the traveling direction of vehicle V, the light emitter 103c located in the direction of 45 degrees to the left with respect to the traveling direction of vehicle V as viewed from the center C1 of the arc AR1 emits light. Consequently, the driver can intuitively recognize the direction of the object.

Figure 5:
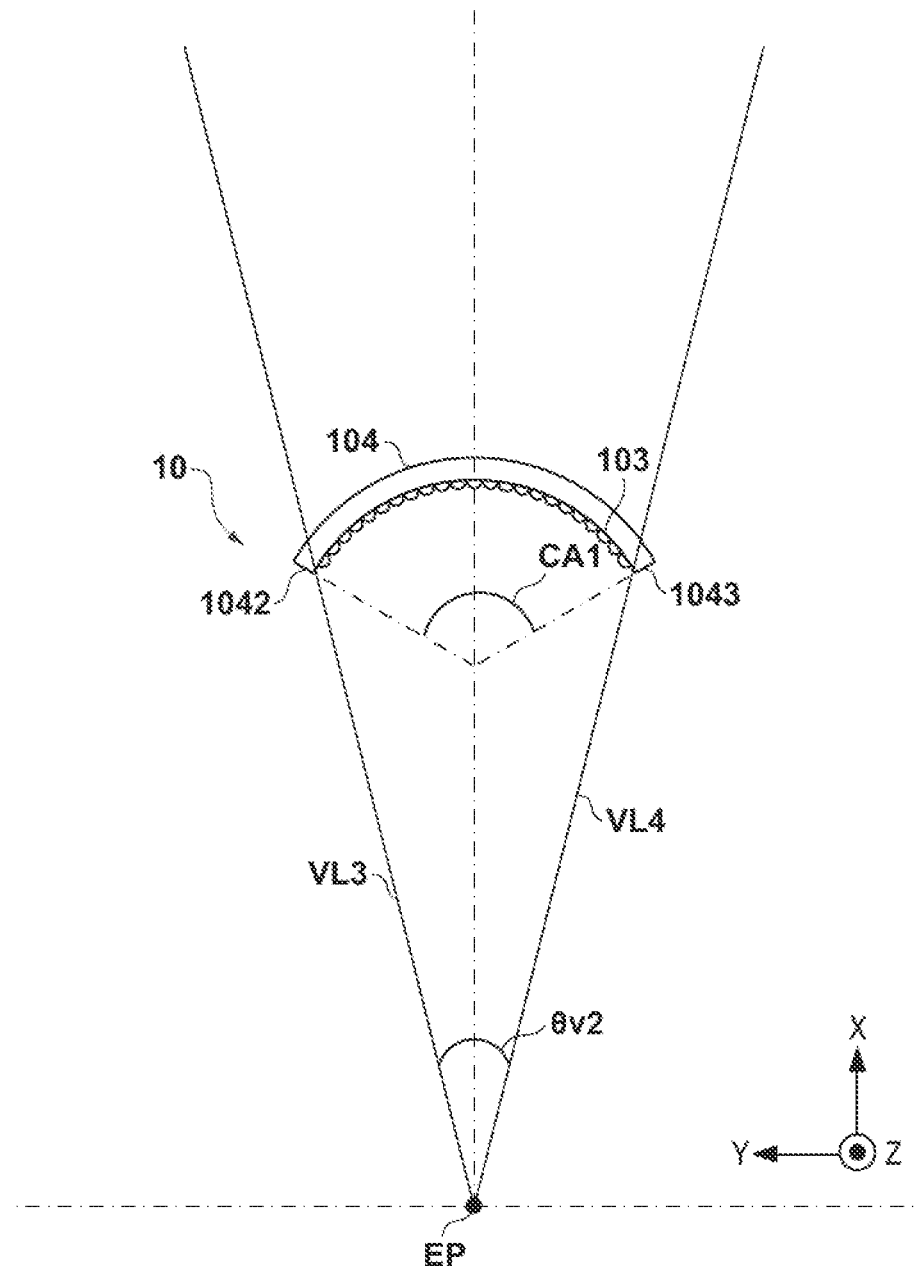
FIG. 5 is a diagram for explaining how the display is placed in the vehicle.

FIG. 5 is a diagram for explaining how the display 10 is placed in the vehicle V. In the present embodiment, the display 10 is placed such that the angle formed by two virtual line segments each connecting one of the opposite ends of the display 10 in the vehicle width direction of the vehicle V and the eye point EP set in the vehicle V lies in the range of 25 to 30 degrees. Specifically, in plan view, the display 10 is placed such that the angle $\theta v2$ formed by the two virtual line segments VL3 and VL4 respectively connecting the ends 1042 and 1043 in the vehicle width direction of the arrangement surface 1041 and the eye point EP set in the vehicle V lies in the range of 25 to 30 degrees. As the eye point EP, for example, the reference eye point defined in Japanese Industrial Standards JIS D1702:1996 can be used.

If the size of the display 10 in the vehicle width direction is too large, that is, if the angle $\theta v2$ is too large, the signal displayed on the display 10 is unlikely to enter the driver's view. On the other hand, if the size of the display 10 in the vehicle width direction is too small, that is, if the angle $\theta v2$ is too small, it might be difficult to understand the correspondence between the direction of the object and the signal indication position on the display 10. By placing the display 10 such that the angle $\theta v2$ lies within the above-described angle range, it is possible to achieve both the visibility of the signal and the ease of recognition of the correspondence to the indication position.

The above-mentioned range of the angle $\theta v2$ (25 to 30 degrees) is an example that is based on the assumption that the detection angle range DA1 of the detector 44 is around 120 degrees. The range of the angle $\theta v2$ may be set as appropriate according to the detection angle range DA1 of the detector 44. For example, if the detection angle range DA1 of the detector 44 is relatively small (e.g. detection angle range DA1=20 degrees), setting the angle $\theta v2$ larger than the detection angle range DA1 cannot necessarily lead to an appropriate expression of the position of the object on the display 10. Therefore, the angle $\theta v2$ may be set to be equal to or smaller than the detection angle range DA1. For example, if the detection angle range DA1 is 20 degrees, the display 10 may be provided such that the angle $\theta v2$ lies in the range of 15 to 20 degrees. On the other hand, if the angle $\theta v2$ is smaller than $\frac{1}{5}$ of the detection angle range DA1, it may be difficult to match the signal indication position on the display 10 with the direction of the object ahead. Therefore, the angle $\theta v2$ may be set to be $\frac{1}{5}$ or more of the detection angle range DA1. For example, if the detection angle range DA1 is 90 degrees, the angle $\theta v2$ may be set to 18 degrees or more. That is, the angle $\theta v2$ may be in the range of $\frac{1}{5}$ of the detection angle range DA1 to the detection angle range DA1. Consequently, it is possible to appropriately associate the signal indication position on the display 10 with the direction of the object ahead.

Hardware Configuration Example

Figure 6:
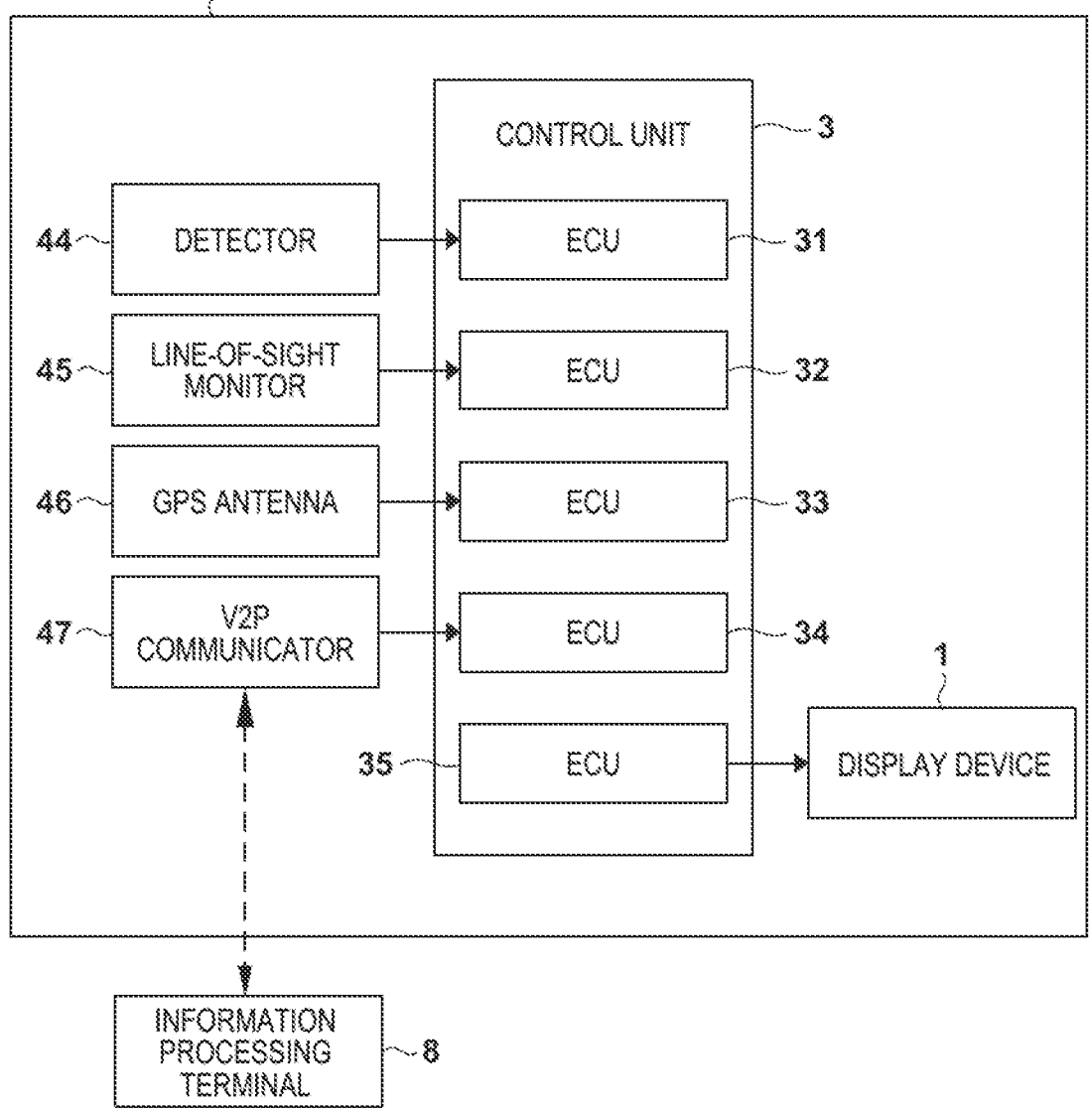
FIG. 6 is a diagram illustrating the hardware configuration of the vehicle V equipped with the display device.

FIG. 6 is a diagram illustrating the hardware configuration of the vehicle V equipped with the display device 1. The detector 44 and the display device 1 are as described above, and thus the description thereof is omitted. The line-of-sight monitor 45 monitors the driver's line of sight. The line-of-sight monitor 45 is, for example, a camera (driver monitoring camera) that captures an image of the driver. A GPS antenna 46 receives radio waves from GPS satellites in order to acquire the current location of the vehicle V. Specifically, the GPS antenna 46 receives radio waves including satellite coordinate data and time data from GPS satellites. A Vehicle-to-Pedestrian (V2P) communicator 47 acquires, from a pedestrian's information processing terminal 8 near the vehicle V, the location information and the like of the information processing terminal 8 through V2P communication in which communication is performed between the vehicle and the pedestrian terminal.

A control unit 3 is a unit that controls the vehicle V, and includes a plurality of ECUs 31 to 35 communicably connected by the in-vehicle network. Each ECU includes a processor represented by a CPU, a storage device such as a semiconductor memory, an interface with an external device, and the like. The storage device stores programs executed by the processor, data used by the processor for processing, and the like. Each ECU may include a plurality of processors, storage devices, interfaces, and the like. Alternatively, each ECU may include a dedicated integrated circuit such as an application-specific integrated circuit (ASIC) for each ECU to execute processing.

Functions assigned to each of the ECUs 31 to 35 will be described hereinbelow. Note that the number of ECUs and the functions assigned to the ECUs can be designed as appropriate and can be subdivided or integrated compared with the present embodiment.

The ECU 31 identifies the distance between the vehicle V and the detected object and the direction of the object as viewed from the vehicle V based on the detection result from the detector 44. The ECU 32 identifies the driver's line of sight based on the detection result from the line-of-sight monitor 45. The ECU 33 identifies the location of the vehicle V based on the data received by the GPS antenna 46 from GPS satellites. The ECU 34 identifies the distance between the vehicle V and the information processing terminal 8 and the direction of the information processing terminal 8 as viewed from the vehicle V from the location information of the information processing terminal 8 received from the information processing terminal 8 and the location of the vehicle V identified by the ECU 33. The ECU 35 controls indication on the display device 1. As will be described in detail later, for example, the ECU 35 causes the selected light emitter 103 to emit light based on the distance between the vehicle V and the object and the direction of the object as viewed from the vehicle V acquired from the ECU 31. In addition, for example, the ECU 35 causes the selected light emitter 103 to emit light based on the distance between the information processing terminal 8 and the object and the direction of the information processing terminal 8 as viewed from the vehicle V acquired from the ECU 34.

The information processing terminal 8 is a terminal carried by a pedestrian or the like. The information processing terminal 8 includes a processor represented by a CPU, a storage device such as a semiconductor memory, a communication device with an external device, and the like. The processor of the information processing terminal 8 controls the communication device of the information processing terminal 8 to transmit a wireless signal for short-range communication in a predetermined communication range by broadcast without designating a destination. The V2P communicator 47 of the vehicle V receives the wireless signal transmitted by the communication device of the information processing terminal 8.

<Operation of Display Device>

Operation Example 1

Figure 7:
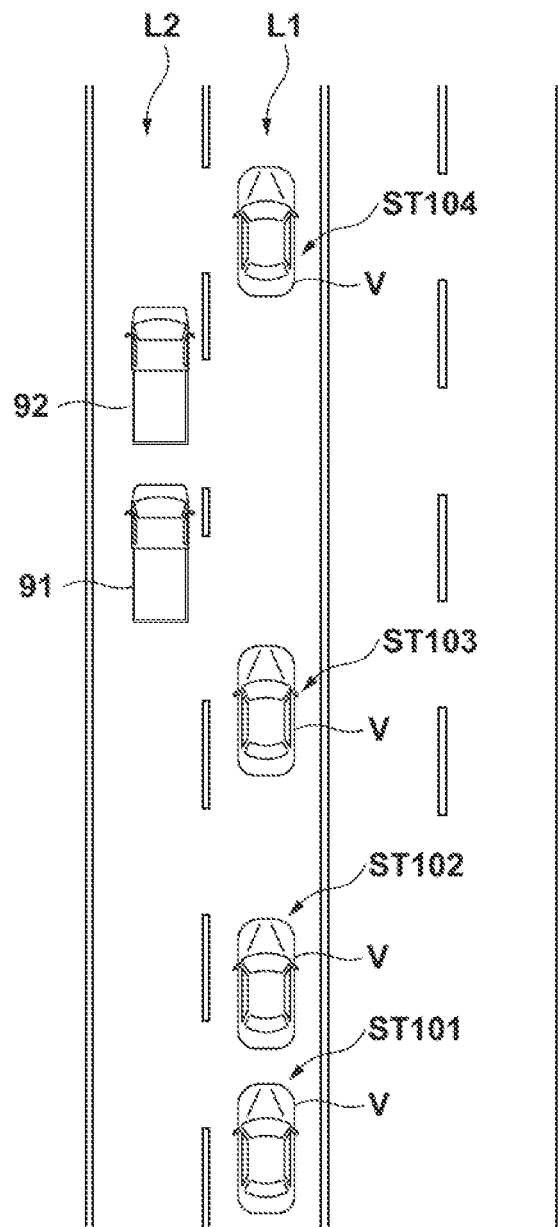
FIG. 7 is a diagram illustrating an example situation in which the display device operates.

Next, an operation example of the display device 1 during the travel of the vehicle V will be described. FIG. 7 is a diagram illustrating an example situation in which the display device 1 operates. FIGS. 8 to 9 are forward views from the driver's seat of the vehicle V in each state in the situation of FIG. 7. The illustrated situation shows that construction vehicles (hereinafter referred to as the vehicles 91 and 92) are parked as objects in an adjacent lane L2 adjacent to a traveling lane L1 on which the vehicle V is traveling, and the vehicle V is passing by the construction vehicles.

State ST101 is a state in which the detector 44 has detected the vehicles 91 and 92 ahead of the vehicle V. At this time, on the display 10 of the display device 1, a signal SG1 is displayed at a position corresponding to the direction of the detected vehicles 91 and 92 as viewed from the vehicle V. That is, the light emitter 103 at the position corresponding to the direction of the detected vehicles 91 and 92 as viewed from the vehicle V is turned on.

State ST102 is a state in which the vehicle V has slightly moved forward from state ST101. In state ST102, the distance between the vehicle V and the vehicles 91 and 92 in the vehicle width direction does not differ from that in state ST101, but the distance between the vehicle V and the vehicles 91 and 92 in the longitudinal direction is shorter than that in state ST101. Therefore, the direction of the vehicles 91 and 92 as viewed from the vehicle V is shifted to the left with respect to the traveling direction. Accordingly, on the display 10, the signal SG1 is displayed at a position on the left side of the signal SG1 in state ST101.

State ST103 is a state in which the vehicle V has further moved forward from state ST102. On the display 10, the signal SG1 is displayed at a position further on the left side of the signal SG1 in state ST102.

State ST104 is a state in which the vehicle V has slightly moved forward from state ST103 and passed by the vehicles 91 and 92. Because the vehicle 91 and the vehicle 92 are out of the detection angle range DA1 of the detector 44, the display of the signal SG1 corresponding thereto on the display 10 is also finished.

In this manner, the signal SG1 is displayed on the display 10 at a position corresponding to the direction of the object ahead of the vehicle V, which allows the driver to easily recognize the presence of the object ahead.

Processing Example 1

Figure 10:
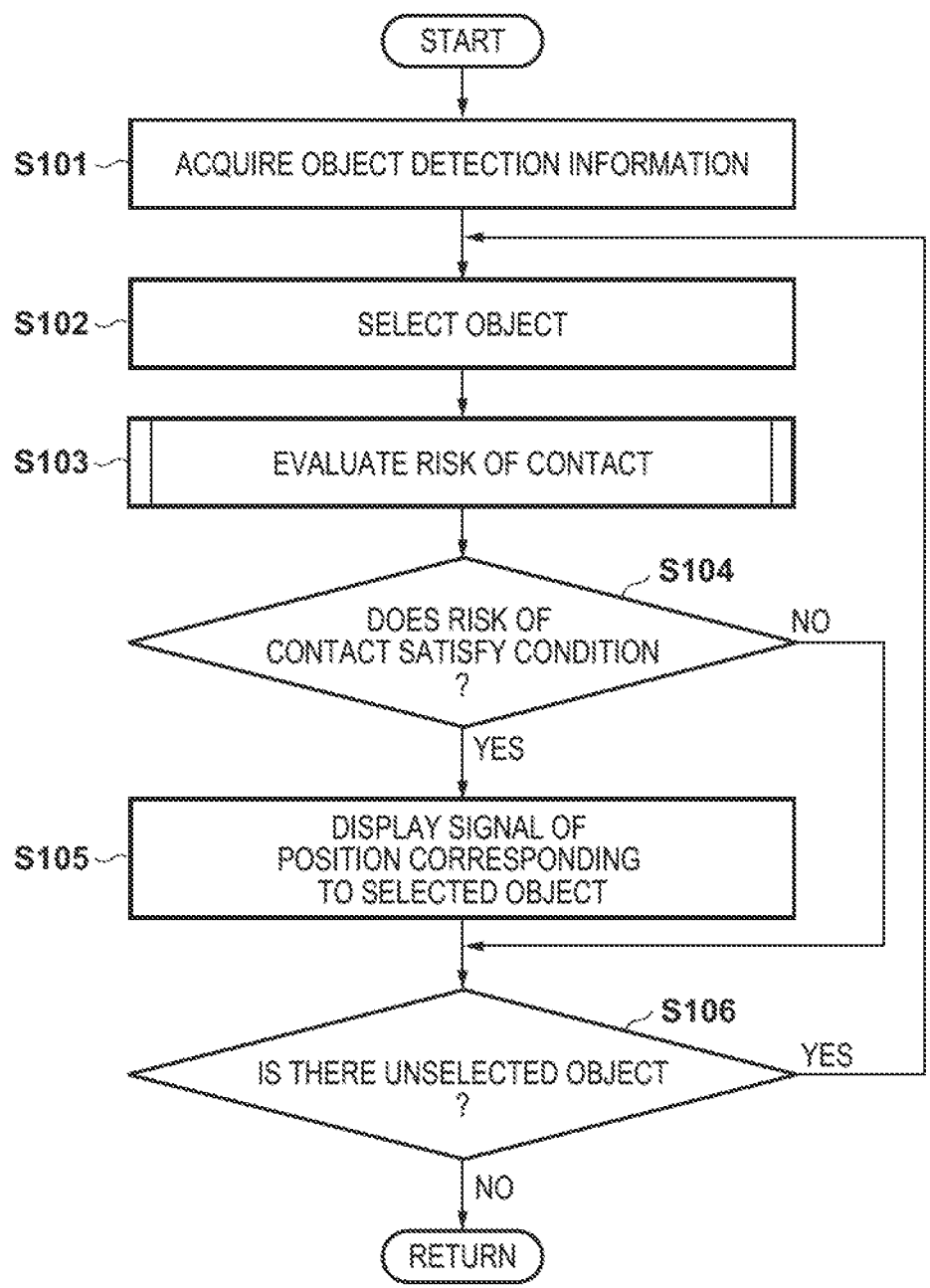
FIG. 10 is a flowchart illustrating a processing example of an ECU.

FIG. 10 is a flowchart illustrating a processing example of the ECU 35, showing how the ECU 35 performs processing when the display device 1 performs the operation of Operation Example 1. For example, this flowchart is implemented by the processor of the ECU 35 such as the CPU reading and executing a program stored in the storage device of the ECU 35 such as the semiconductor memory. In addition, for example, this flowchart is repeatedly executed at predetermined intervals while the vehicle V is traveling. Note that in the following description, each step is simply denoted by S101, for example.

In S101, the ECU 35 acquires object detection information. Specifically, the ECU 35 acquires, from the ECU 31, information that is based on the detection result from the detector 44 as object detection information. Examples of object detection information include the distance between the vehicle V and the detected object, the direction of the object as viewed from the vehicle V, and the relative speed between the vehicle V and the object. Note that the detector 44 can detect a plurality of objects (for example, the vehicles 91 and 92), in which case the ECU 35 acquires information on each object.

In S102, the ECU 35 selects an object. If the information acquired in S101 includes information on a plurality of objects, the ECU 35 selects one of the plurality of objects.

In S103, the ECU 35 evaluates the risk of contact between the vehicle V and the selected object. Here, the risk of contact between the vehicle V and the object is expressed by three risk levels of "high", "medium", and "low". However, the risk levels may be subdivided, or may be binary ones such as "at risk" or "not at risk". Alternatively, the risk of contact may be expressed numerically, for example, as a percentage.

A known technique can be used as appropriate as a method of evaluating the risk level; the ECU 35 may evaluate the risk level based on information such as the distance between the vehicle V and the object in the longitudinal direction or the vehicle width direction, the behavior of the object, the relative speed between the vehicle V and the object, and the lane where the vehicle V and the object exist. For example, when the distance between the vehicle V and the object is equal to or greater than a predetermined value, the ECU 35 may rate the risk level lower than when the distance is less than the predetermined value. In addition, for example, for an object having a relatively low speed relative to the vehicle V, e.g. a vehicle traveling ahead of the vehicle V, the ECU 35 may rate the risk level lower than for an object having a relatively high speed relative to the vehicle V, e.g. a pedestrian or a fallen object on a lane. In addition, for example, for an object on the lane on which the vehicle V is traveling, the ECU 35 may rate the risk level higher than for an object outside the lane on which the vehicle V is traveling. That is, the ECU 35 can comprehensively evaluate the risk level based on the various types of information described above.

In the present embodiment, for example, the ECU 35 rates the risk level "low" for an object separated from the vehicle V by a predetermined distance or more and/or having a low speed relative to the vehicle V, such as a preceding vehicle. That is, it can be said that an object with a "low" risk level is an object with a low necessity of notification to the driver at the time of evaluation. In addition, for example, the ECU 35 rates the risk level "medium" when the distance between the vehicle V and the selected object is less than the predetermined distance, but the object is not on the lane on which the vehicle V is traveling. In addition, for example, the ECU 35 rates the risk level "high" when the distance between the vehicle V and the selected object is less than the predetermined distance, and the object is on the lane on which the vehicle V is traveling. In addition, for example, the ECU 35 rates the risk level "high" when the distance between the vehicle V and the selected object is less than the predetermined distance, and the object is not on the lane on which the vehicle V is traveling but is moving like a pedestrian and may enter the lane on which the vehicle V is traveling. Note that the predetermined distance here may be a predetermined constant value, or may be a variable value that depends on the speed of the vehicle V and in which the braking distance is considered.

In S104, the ECU 35 checks whether the risk of contact satisfies a condition, and proceeds to S105 if the condition is satisfied, otherwise proceeds to S106. An example of the condition is that the risk level is "high" or "medium". For example, in a state like state ST101, if the ECU 35 rates the risk level of the vehicle 91 or 92 "medium" in S103, the ECU 35 proceeds to S105.

In S105, the ECU 35 executes display control of the display 10. More specifically, the ECU 35 displays the signal of the position corresponding to the direction of the selected object. The ECU 35 refers to information on the direction of the object selected in S102 from the information acquired in S101. Then, the ECU 35 causes the signal SG1 to be displayed at the position corresponding to the direction of the selected object.

In S106, the ECU 35 returns to S102 if there is an unselected object, otherwise ends the flowchart. Through the above processing by the ECU 35, the position of the signal displayed on the display 10 of the display device 1 changes as the direction of the vehicles 91 and 92 as viewed from the vehicle V changes as illustrated in FIGS. 8 to 9.

As described above, according to this processing example, if an object is present ahead of the vehicle V, a signal is displayed on the display 10 at a position corresponding to the direction of the object. Therefore, the driver can intuitively recognize the surrounding situation of the vehicle V.

Operation Example 2

Next, another operation example of the display device 1 will be described. This operation example is different from Operation Example 1 in that a signal is displayed on the display 10 in a manner that depends on the risk of contact between the vehicle V and the object. Specifically, the display 10 displays the signal in a color that depends on the risk level of contact between the vehicle V and the object. More specifically, in the present embodiment, the display 10 can display an orange signal SG2 corresponding to an object with a "medium" risk level and a red signal SG3 corresponding to an object with a "high" risk level. Note that the signal color corresponding to each risk level can be changed as appropriate.

In addition, in this operation example, an object around the vehicle V is detected using information received by the V2P communicator 47 in addition to the detector 44. Furthermore, in this operation example, the risk level is determined by further taking into account the driver's line of sight monitored by the line-of-sight monitor 45.

Figure 11:
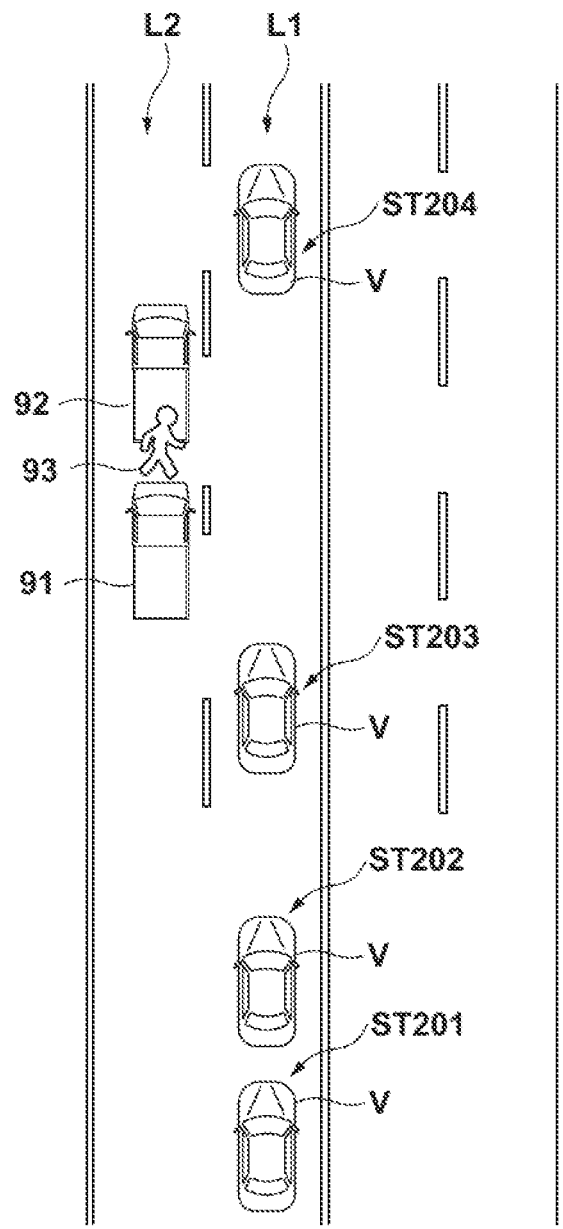
FIG. 11 is a diagram illustrating an example situation in which the display device operates.

FIG. 11 is a diagram illustrating an example situation in which the display device 1 operates. FIGS. 12 to 13 are forward views from the driver's seat of the vehicle V in each state in the situation of FIG. 11. The illustrated situation shows that the construction vehicles (vehicles 91 and 92) are parked in the adjacent lane L2 adjacent to the traveling lane L1 on which the vehicle V is traveling, and a pedestrian 93 as an object is crossing the road from between the vehicles 91 and 92. Note that in FIGS. 12 to 13, the direction of the driver's line of sight identified by the line-of-sight monitor 45 is virtually indicated by a mark 451.

State ST201 is a state in which the detector 44 has detected the vehicles 91 and 92, and the ECU 34 has recognized the presence of the pedestrian based on information or the like received by the V2P communicator 47 from the information processing terminal 8 held by the pedestrian 93. As will be described in detail in (Processing Example 2), in state ST201, the risk levels of the vehicles 91 and 92 and the pedestrian 93 are all rated "medium", and thus the display 10 displays the orange signal SG2 at the corresponding position.

State ST202 is a state in which the vehicle V has slightly moved forward from state ST201. The signal indication position on the display device 1 has changed in accordance with the change in the direction of the vehicles 91 and 92 and the pedestrian 93 as viewed from the vehicle V. As will be described in detail in (Processing Example 2), the risk levels of the vehicles 91 and 92 are recognized as "medium" in state ST202, and thus the display 10 displays the signal SG2 at the corresponding position. On the other hand, the risk level of the pedestrian 93 is recognized as "high", and thus the display 10 displays the red signal SG3 at the corresponding position. Note that in this example, the position corresponding to the direction of the vehicles 91 and 92 and the position corresponding to the direction of the pedestrian partially overlap on the display 10, but the red signal SG3 indicating a higher risk level is given priority in the overlapping part.

The state transitions in states ST203 to ST204 are similar to those in states ST103 to ST104. In brief, as the vehicle V approaches the vehicles 91 and 92 and the pedestrian 93, the direction of the vehicles 91 and 92 and the pedestrian 93 as viewed from the vehicle V shifts, and accordingly the signal indication position on the display 10 changes.

Processing Example 2

FIG. 14A is a flowchart illustrating a processing example of the ECU 35, showing how the ECU 35 performs processing when the display device 1 performs the operation of Operation Example 2. For example, this flowchart is implemented by the processor of the ECU 35 such as the CPU reading and executing a program stored in the storage device of the ECU 35 such as the semiconductor memory. In addition, for example, this flowchart is repeatedly executed at predetermined intervals while the vehicle V is traveling. Note that S201 to S202 and S206 are similar to S101 to S102 and S106, respectively, and thus the description thereof is omitted.

In S203, the ECU 35 evaluates the risk of contact between the vehicle V and the selected object. In this processing example, the ECU 35 evaluates the risk of contact by considering whether the driver is visually recognizing the object in addition to the relative positional relationship and/or speed relationship between the vehicle V and the object. FIG. 14B illustrates a specific processing example of S203.

In S231, the ECU 35 calculates the risk level that is based on the relationship between the vehicle V and the object. More specifically, the ECU 35 calculates the risk level based on the relative positional relationship and/or speed relationship between the vehicle V and the object. Specifically, the ECU 35 can calculate the risk level using the method described in S103 of FIG. 10. For example, in a case where the selected object in state ST202 is the vehicle 91, the ECU 35 rates the risk level "high" because the distance between the vehicle V and the vehicle 91 is less than the predetermined distance. In a case where the selected object is the vehicle 92 or the pedestrian 93, the risk level is rated "high" similarly.

In S232, the ECU 35 performs a visual recognition determination process. The visual recognition determination process is a process of determining whether the driver is visually recognizing the object. The ECU 35 determines whether the driver is visually recognizing the target object based on the information on the driver's line of sight acquired from the line-of-sight monitor 45 and the information on the direction of the object acquired from the ECU 31. For example, in a case where the selected object in state ST202 is the vehicle 91 or the vehicle 92, because the mark 451 indicating the direction of the driver's line of sight overlaps the vehicle 91, the ECU 35 determines that the vehicle 91 or 92 is being visually recognized. On the other hand, in a case where the selected object is the pedestrian 93, because the pedestrian 93 is not detected by the detector 44, it is considered that the pedestrian 93 is located in the blind spot behind the vehicle 91 as viewed from the driver. Therefore, the ECU 35 determines that the driver is not visually recognizing the pedestrian 93 even though the driver's line of sight may be directed toward the pedestrian 93. That is, there is a high possibility that the object detected based on the information received by the V2P communicator 47 has not been visually recognized by the driver unless the object has been detected by the detector 44; in such a case, therefore, it is determined that the object is not being visually recognized.

In S233, if it is determined in S232 that the driver is visually recognizing the object, the ECU 35 proceeds to S234, otherwise ends the flowchart. In S234, the ECU 35 lowers the risk level calculated in S231 by one. Conversely, when the selected object is not being visually recognized by the driver, a higher risk level is given than when the selected object is being visually recognized.

Returning to FIG. 14A, in S204, the ECU 35 proceeds to S205 if the evaluation result in S203 is "high", proceeds to S207 if the evaluation result is "medium", and proceeds to S206 if the evaluation result is "low".

In S205, the ECU 35 displays the signal of the position corresponding to the selected object in red. The ECU 35 refers to information on the direction of the object selected in S202 from the information acquired in S201. Then, the ECU 35 causes the light emitter 103 at the position corresponding to the direction of the selected object to emit light in red.

In S207, the ECU 35 displays the signal of the position corresponding to the selected object in orange. The ECU 35 refers to information on the direction of the object selected in S202 from the information acquired in S201. Then, the ECU 35 causes the light emitter 103 at the position corresponding to the direction of the selected object to emit light in orange.

According to this processing example, a signal is displayed on the display 10 in a manner that depends on the risk level of the object, which can help the driver more appropriately grasp the surrounding situation. In addition, the risk level of an object which is not being visually recognized by the driver is rated relatively high, which can make the driver effectively recognize the presence of the object which is not being recognized by the driver.

Note that in this processing example, the risk level is lowered by one when the driver is visually recognizing the object, but it is also possible to adopt a configuration in which no signal is displayed when the driver is visually recognizing the object. For example, if it is determined in S232 that the driver is visually recognizing the object, the risk level may be lowered to "low", at which signal indication is not provided. This makes it possible to display signals exclusively for an object which is not being visually recognized by the driver, so that the driver can be effectively notified of an object with a high risk of contact while being less annoyed with signals.

Operation Example 3

Next, still another operation example of the display device 1 will be described. This operation example is different from Operation Example 2 in the method of evaluating the risk of contact. Specifically, in Operation Example 2, the risk level is evaluated such that an object which is not being recognized by the driver is given a relatively high risk level. As a result, the manner of signal indication on the display 10 varies depending on whether the driver is visually recognizing the object or not. On the other hand, in this operation example, even when the driver is not visually recognizing the object, the signal is displayed on the display 10 in the same manner as when the driver is visually recognizing the object for a predetermined time after the last visual recognition. Note that the predetermined time here can be set as appropriate; for example, may be set to a value between 3 and 10 seconds.

Figure 15:
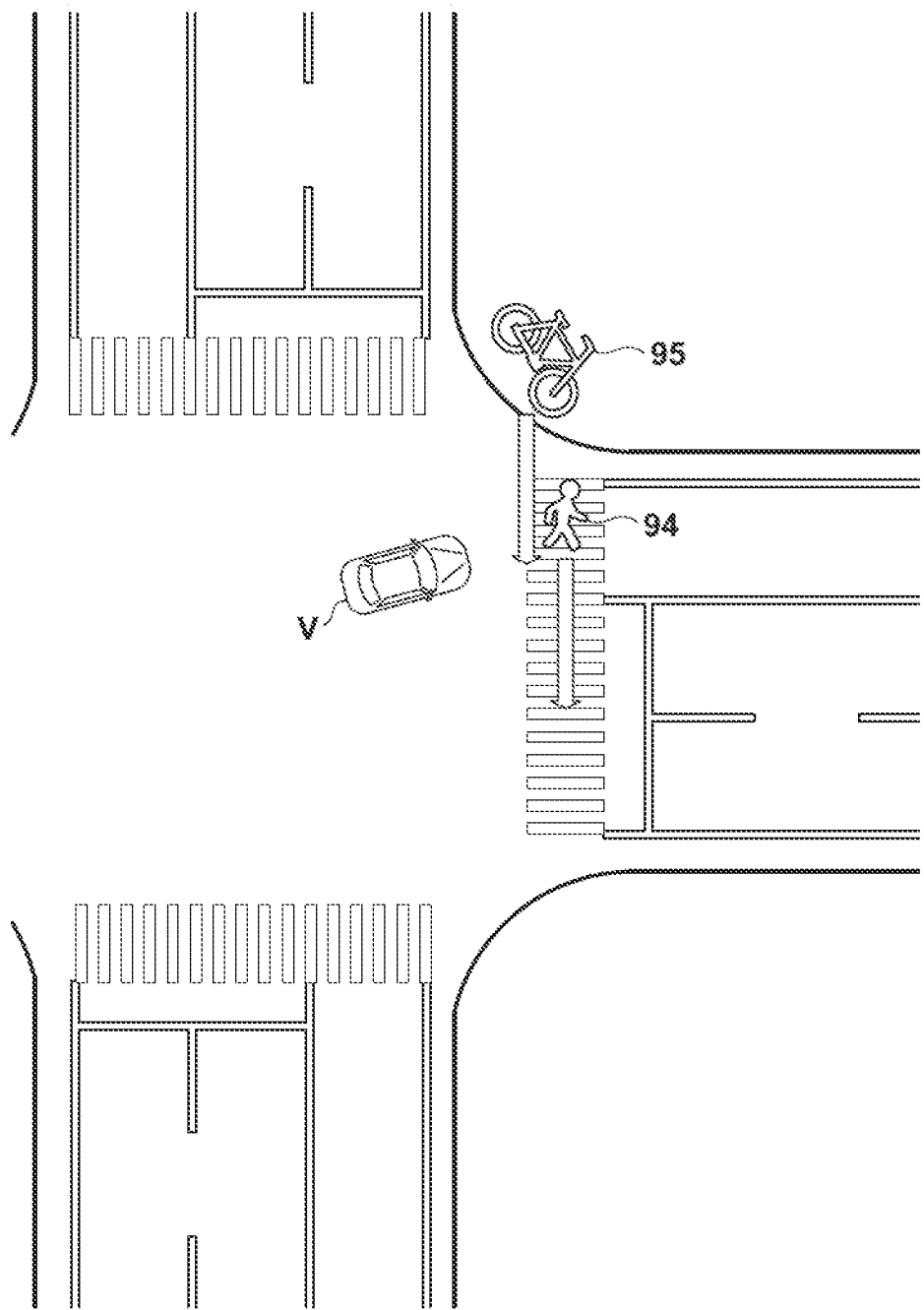
FIG. 15 is a diagram illustrating an example situation in which the display device operates.

FIG. 15 is a diagram illustrating an example situation in which the display device 1 operates. FIGS. 16 to 17 are forward views from the driver's seat of the vehicle V in each state in the situation of FIG. 15. The illustrated situation shows that the vehicle V is about to turn right at the intersection but is waiting for a pedestrian and the like to cross at the crosswalk. Specifically, the situation shows that after a pedestrian 94 as an object detected by the detector 44 crosses in front of the vehicle V, a bicycle 95 as an object detected by the detector 44 crosses in front of the vehicle V.

State ST301 is a state in which the pedestrian 94 has started to cross in front of the vehicle V. At this time, the driver's line of sight is directed to the pedestrian 94 as indicated by the mark 451, and it is considered that the driver is recognizing the pedestrian 94. Therefore, the ECU 35 rates the risk level of the pedestrian 94 "medium" and displays the orange signal SG2 at the corresponding position on the display 10.

State ST302 is a state in which the pedestrian 94 has almost finished crossing in front of the vehicle V, and the bicycle 95 has started to cross in front of the vehicle V. At this time, the driver's line of sight is directed to the pedestrian 94 as indicated by the mark 451, and it is considered that the driver is recognizing the pedestrian 94 but is not recognizing the bicycle 95. Therefore, the ECU 35 rates the risk level of the pedestrian 94 "medium" and displays the orange signal SG2 at the corresponding position on the display 10, while the ECU 35 rates the risk level of the bicycle 95 "high" and displays the red signal SG3 at the corresponding position on the display 10.

State ST303 is a state in which the pedestrian 94 has finished crossing in front of the vehicle V, and the bicycle 95 keeps crossing in front of the vehicle V. Although the pedestrian 94 is not illustrated here, the pedestrian 94 is present in the detection angle range DA1 of the detector 44, and thus the signal corresponding to the pedestrian 94 is displayed on the display 10. In addition, the driver's line of sight is not directed to the pedestrian 94 as indicated by the mark 451, but the predetermined time has not elapsed since the driver's last visual recognition of the pedestrian 94; therefore, the ECU 35 rates the risk level of the pedestrian 94 "medium" and displays the orange signal SG2. Meanwhile, the driver has not yet visually recognized the bicycle 95, and thus the ECU 35 rates the risk level of the bicycle 95 "high" and displays the red signal SG3 at the corresponding position on the display 10.

State ST304 is a state in which the bicycle 95 has almost finished crossing in front of the vehicle V. Because the pedestrian 94 is out of the detection angle range DA1 of the detector 44, no signal is displayed on the display 10 corresponding to the pedestrian 94. In addition, the driver's line of sight is directed to the bicycle 95 as indicated by the mark 451, and thus the ECU 35 rates the risk level of the bicycle 95 "medium" and displays the orange signal SG2 at the corresponding position on the display 10.

According to this operation example, it is possible to prevent the signal indication on the display 10 from being frequently switched due to, for example, a change in the color of the signal or disappearance of the signal soon after the driver's removal of the line of sight from the object. Therefore, it is possible to prevent signal flickering to make the driver feel less annoyed. In addition, because the risk level of an object which has once been visually recognized is unlikely to rise for the predetermined time, it is possible to effectively notify the driver of an object which is not being visually recognized by the driver and has a higher risk of contact.

Processing Example 3

Figure 18:
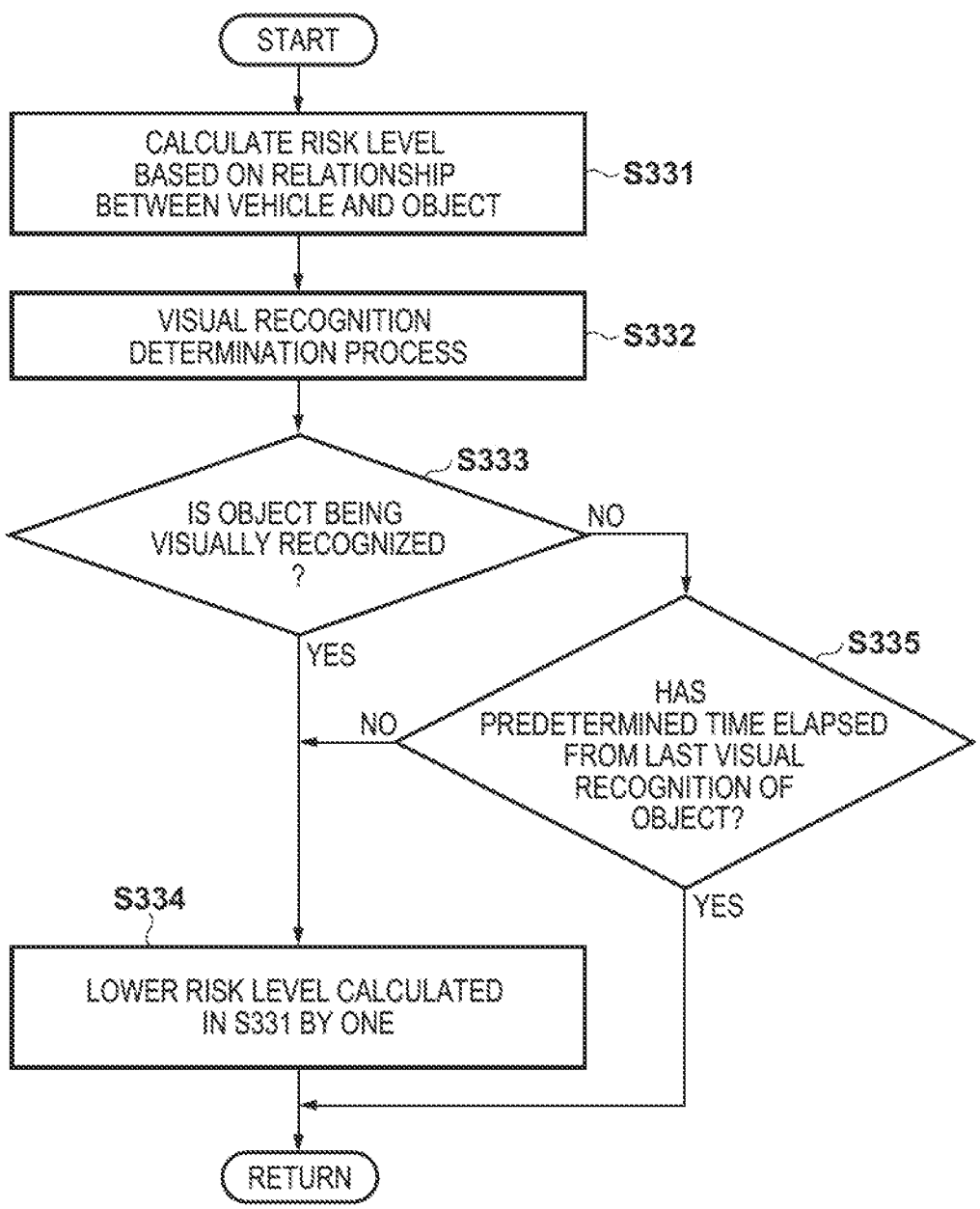
FIG. 18 is a flowchart illustrating a processing example of an ECU.

FIG. 18 is a flowchart illustrating a processing example of the ECU 35, showing a specific processing example of S203 in FIG. 14A. That is, when the display device 1 performs the operation of Operation Example 3, the ECU 35 executes the process of FIG. 14A, but the specific procedure for S203 is different from that in the case of performing the operation of Operation Example 2.

S331 and S332 are steps similar to S231 and S232, respectively. For example, in a case where the selected object in state ST302 is the bicycle 95, the ECU 35 rates the risk level "high" because the distance between the vehicle V and the bicycle 95 is less than the predetermined distance and the bicycle 95 is moving.

In S333, if it is determined in S332 that the driver is visually recognizing the object, the ECU 35 proceeds to S334, otherwise proceeds to S335. In S335, the ECU 35 checks whether the predetermined time has elapsed since the driver's last visual recognition of the object, and if the predetermined time has elapsed, ends the flowchart, otherwise proceeds to S334. Because this flowchart is repeatedly executed at predetermined intervals, the ECU 35 can acquire the elapsed time from the driver's last visual recognition of the object using the determination results in previous control cycles. In S334, the ECU 35 lowers the risk level calculated in S331 by one.

Through steps S333 to S335, the ECU 35 lowers the risk level calculated in step S331 by one if the driver is visually recognizing the object and if the driver is not currently visually recognizing the object but the predetermined time has not elapsed since the last visual recognition. That is, until the predetermined time elapses after the driver's last visual recognition of the object, the signal is displayed in the same manner as when the driver is visually recognizing the object.

If the driver has once visually recognized the object, the risk of contact is considered to be low. Therefore, by displaying the signal in the same manner as when the driver is visually recognizing the object for the predetermined time after the driver's removal of the line of sight, it is possible to prevent the signal indication from being frequently switched, and to prevent the driver from feeling annoyed more effectively.

Other Embodiments

Figure 19:
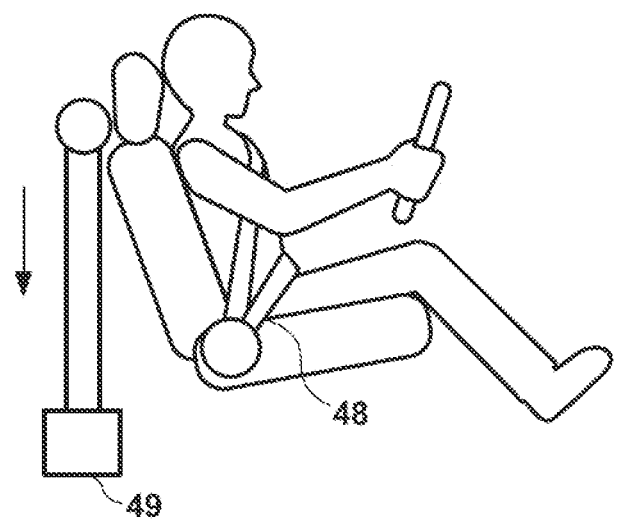
FIG. 19 is a schematic diagram illustrating the configuration of an adjuster for the tension of the seat belt for the driver's seat according to an embodiment.

It is also possible to adopt a configuration in which the signal indication by the display device 1 is linked to the tension of the seat belt for the driver's seat. FIG. 19 is a schematic diagram illustrating the configuration of an adjuster for the tension of the seat belt for the driver's seat according to an embodiment.

The vehicle V includes an adjuster 49 that adjusts the tension of a seat belt 48 worn by the driver. The adjuster 49 increases the tension of the seat belt 48 by pulling the seat belt 48 in the direction of the arrow in the drawing with the rotational driving force of a motor or the like. The adjuster 49 also reduces the tension of the seat belt 48 by rotating the motor or the like in the direction opposite to the direction in which the tension of the seat belt 48 is increased. The driving of the adjuster 49 can be controlled by an ECU included in the control unit 3.

In such a configuration, the manner of signal indication on the display device 1 and the tension of the seat belt 48 adjusted by the adjuster 49 may be linked. For example, the adjuster 49 may be configured not to generate tension on the seat belt 48 when no signal is displayed on the display 10, and to generate tension on the seat belt 48 when a signal is displayed on the display 10. In addition, for example, in a case where the manner of signal indication on the display 10 depends on the risk level of the object, the tension of the seat belt 48 may be adjusted by the adjuster 49 such that the seat belt 48 has a higher tension at the risk level "high" than at the risk level "medium". Alternatively, the adjuster 49 may generate tension on the seat belt 48 when a signal is displayed on the display 10 and the driver is not visually recognizing the target object. This allows the driver to more easily grasp the risk of contact with the object.

The above embodiment has described the configuration in which signals are displayed in different colors as an example of changing the manner of signal indication according to the risk level; however, the manner of signal indication may be changed using different levels of signal brightness, different patterns of blinking, or the like.

In addition, the display 10 may have a diffusion plate that diffuses light emitted by the plurality of light emitters 103. The provision of the diffusion plate is effective in preventing signal flickering especially when the size of the light emitters 103 is small, for example.

In addition, in the signal indication by the display 10, the width of a signal may be a fixed value or may vary according to the width of the detection angle of the object. Setting the width of a signal to a fixed value (for example, the value corresponding to one light emitter 103) is advantageous in that the driver can readily recognize a plurality of objects that exist in substantially the same direction. In addition, varying the width of a signal according to the detection angle of the object is advantageous in that the driver can more accurately grasp the presence of the object. In addition, in a case where a signal is displayed with some width, the color of the signal may differ between the central part and the outer part.

In addition, in the above embodiment, the display 10 does not display a signal at a position corresponding to a direction in which no object is detected or a direction in which an object with a low risk level is present, but signals may also be displayed at these positions. For example, the display 10 may display a red or orange signal at a position corresponding to a direction in which an object with a high risk level is present, and may display a green or light blue signal at a position corresponding to a direction in which no object is detected or a direction in which an object with a low risk level is present.

In addition, the shape of the display 10 is not limited to the arc shape, and other shapes can be adopted. For example, a part of the base portion 104 may be formed linearly in plan view, or a plurality of linear parts may be combined to form the base portion 104. That is, the display 10 only needs to include a part recessed forward in the vehicle longitudinal direction in plan view.

In addition, for example, in a case where the detector 44 (camera) is installed at the center in the vehicle width direction of the vehicle, because the display 10 needs to be installed in front of the driver, the position of the signal (LED lighting) displayed corresponding to the detected object may appear to deviate from the position of the object as the object approaches the vehicle. For example, in the case of a right-hand drive vehicle, an object in front of the detector 44 may be seen by the driver to be located diagonally forward left. In order to correct this, calculation may be performed to correct the position of the object detected by the detector 44 to the position of the object as viewed from the driver, and the signal indication position may be converted to match the position of the object as viewed from the driver.

Summary of Embodiments

The above embodiments disclose at least the following vehicle.

1. A vehicle (for example, V) comprising:
a detector (for example, 44) configured to detect an object at least ahead of the vehicle; and
a display (for example, 10) provided on an instrument panel (for example, 2) of the vehicle and configured to display a signal at a position corresponding to a direction of the object detected by the detector, wherein
the display includes a part recessed forward in a vehicle longitudinal direction in plan view.

According to this embodiment, it is possible to provide the surrounding situation of the vehicle to the driver in an easy-to-recognize manner.

2. The vehicle according to claim 1, wherein
the display is provided above a meter visor (for example, 22) included in the instrument panel.

According to this embodiment, the display is located where the display is likely to stay in the driver's field of vision during driving, so that the driver can easily check the indication on the display during driving. In addition, the signal can enter the lower part of the driver's view without blocking the view.

3. The vehicle according to claim 1, wherein
the display includes a part shaped like an arc, and
a central angle (for example, CA1) of the arc (for example, AR1) formed by the display corresponds to a detection angle range (for example, DA1) of the detector.

According to this embodiment, the direction of the object as viewed from the vehicle can be more accurately reflected in the signal indication on the display.

4. The vehicle according to claim 3, wherein
the display includes a plurality of light emitting elements (for example, 103) provided along a circumferential direction of the arc, and
an angle (for example, θv1) formed by two virtual line segments (for example, VL1, VL2) each connecting a center of the arc and one of two adjacent light emitting elements of the plurality of light emitting elements is equal to or larger than a detection error angle in the detector.

According to this embodiment, it is possible to prevent the signal indication from flickering due to the influence of detection error.

5. According to the above embodiments, 5. The vehicle according to claim 3, wherein
an angle (for example, θv2) formed by two virtual line segments (for example, VL3, VL4) each connecting one of opposite ends (for example, 1042, 1043) of the display in a vehicle width direction and an eye point (for example, EP) set in the vehicle is in a range of ⅕ of the detection angle range to the detection angle range.

According to this embodiment, it is possible to appropriately associate the signal indication position on the display with the direction of the object ahead.

6. The vehicle according to claim 1, further comprising:
a line-of-sight monitor (for example, 45) configured to monitor a driver's line of sight; and
a determination unit (for example, 35, S232) configured to determine whether the driver is visually recognizing the object detected by the detector based on a monitoring result from the line-of-sight monitor, wherein
the display displays the signal in different manners depending on whether it is determined by the determination unit that the driver is visually recognizing the object or it is determined by the determination unit that the driver is not visually recognizing the object (for example, S233-S234).

According to this embodiment, the driver can recognize the presence of an object which is not being visually recognized by the driver, and thus can more accurately grasp the situation surrounding the vehicle.

7. The vehicle according to claim 6, wherein
while it is determined by the determination unit that the driver is not visually recognizing the object, the display displays the signal in a same manner as when the driver is visually recognizing the object until a predetermined time elapses after a last determination by the determination unit that the driver is visually recognizing the object (for example, S333-S335).

According to this embodiment, it is possible to prevent the signal indication from being frequently switched to make the driver feel less annoyed.

8. The vehicle according to claim 1, further comprising
an evaluation unit (for example, S203) configured to evaluate a risk of contact between the vehicle and the object detected by the detector, wherein
the display displays the signal in a manner that depends on the risk of contact evaluated by the evaluation unit (for example, S204-205).

According to this embodiment, the signal is displayed in a manner that depends on the risk of contact, which allows the driver to more accurately grasp the situation surrounding the vehicle.

9. The vehicle according to claim 8, wherein
the display displays the signal with light of a color that depends on the risk of contact (for example, S204-S205).

According to this embodiment, it is possible to more intuitively grasp the risk of contact with the object. In addition, it is possible to notify the driver of the risk of contact with a simple structure.

10. The vehicle according to claim 8, wherein
the display displays the signal when the risk of contact satisfies a predetermined condition (for example, S104).

According to this embodiment, no signal is displayed for an object with a low risk of contact, which allows the driver to be notified of only necessary information.

11. The vehicle according to claim 1, further comprising
an adjuster (for example, 49) configured to adjust tension of a seat belt (for example, 48) worn by a driver, wherein
the tension of the seat belt adjusted by the adjuster is linked to a manner in which the signal is displayed by the display.

According to this embodiment, the driver can more readily recognize the situation surrounding the vehicle.

The invention is not limited to the foregoing embodiments, and various variations/changes are possible within the spirit of the invention.

What is claimed is:

1. A vehicle comprising:
a detector configured to detect an object at least ahead of the vehicle; and
a display provided on an instrument panel of the vehicle and configured to display a signal at a position corresponding to a direction of the object detected by the detector, wherein
the display includes an arc shape portion recessed forward in a vehicle longitudinal direction in plan view,
the detector has a detection error angle,
the display includes a plurality of light emitting elements provided along a circumferential direction of the arc, and
an angle formed by two virtual line segments each connecting a center of the arc and one of two adjacent light emitting elements of the plurality of light emitting elements is equal to or larger than the detection error angle in the detector.

2. The vehicle according to claim 1, wherein
the display is provided above a meter visor included in the instrument panel.

3. The vehicle according to claim 1, wherein
the detector has a detection angle range, and
a central angle of the arc formed by the arc shape portion of the display corresponds to the detection angle range of the detector.

4. The vehicle according to claim 1, wherein
the vehicle has an eye point set in the vehicle,
an angle formed by two virtual line segments each connecting one of opposite ends of the display in a vehicle width direction and the eye point set in the vehicle is in a range of ⅕ of the detection angle range to the detection angle range.

5. The vehicle according to claim 1, further comprising:
a line-of-sight monitor configured to monitor a line of sight of a driver of the vehicle; and
at least one processor circuit and a memory storing instructions, that when executed by the processor circuit, cause the processor circuit to determine whether the driver is visually recognizing the object detected by the detector based on a monitoring result from the line-of-sight monitor, wherein
the display displays the signal in different manners depending on whether it is determined that the driver is visually recognizing the object or it is determined that the driver is not visually recognizing the object.

6. The vehicle according to claim 5, wherein
while it is determined that the driver is not visually recognizing the object, the display displays the signal in a same manner as when the driver is visually recognizing the object until a predetermined time elapses after a last determination that the driver is visually recognizing the object.

7. The vehicle according to claim 1, further comprising
at least one processor circuit and a memory storing instructions, that when executed by the processor circuit, cause the processor circuit to evaluate a risk of contact between the vehicle and the object detected by the detector, wherein
the display displays the signal in a manner that depends on the evaluated risk of contact.

8. The vehicle according to claim 7, wherein
the display displays the signal with light of a color that depends on the risk of contact.

9. The vehicle according to claim 7, wherein
the display displays the signal when the risk of contact satisfies a predetermined condition.

10. The vehicle according to claim 1, further comprising
an adjuster configured to adjust tension of a seat belt worn by a driver, wherein
the tension of the seat belt adjusted by the adjuster is linked to a manner in which the signal is displayed by the display.

11. The vehicle according to claim 1, wherein
the direction of the object detected by the detector is corrected to correspond to a direction in which the object is viewed from an eye point when being displayed at a corresponding position on the display.

12. The vehicle according to claim 1, wherein
the display includes a plurality of light emitting elements arranged to emit light to a driver of the vehicle.

13. A vehicle comprising:
a detector configured to detect an object at least ahead of the vehicle; and
a display provided on an instrument panel of the vehicle and configured to display a signal at a position corresponding to a direction of the object detected by the detector, wherein
the detector has a detection angle range,
the display includes an arc shape portion recessed forward in a vehicle longitudinal direction in plan view, and
a central angle of the arc formed by the arc shape portion of the display corresponds to the detection angle range of the detector.

* * * * *